(12) United States Patent  
Geoffrion et al.

(10) Patent No.: US 12,523,035 B1  
(45) Date of Patent: Jan. 13, 2026

(54) WATER VAPOR PERMEABLE RIBBED MEMBRANES AND RELATED SYSTEMS AND RELATED METHODS

(71) Applicant: Siplast Inc., Irving, TX (US)

(72) Inventors: Luke Geoffrion, Malvern, AR (US); Benjamin Alan Meyer, Moseley, VA (US); Christopher Fetterman, Irving, TX (US)

(73) Assignee: Siplast Inc., Irving, TX (US)

( * ) Notice: Subject to any disclaimer, the term of this patent is extended or adjusted under 35 U.S.C. 154(b) by 0 days.

(21) Appl. No.: 18/409,534

(22) Filed: Jan. 10, 2024

Related U.S. Application Data

(60) Provisional application No. 63/479,401, filed on Jan. 11, 2023.

(51) Int. Cl.
| | |
|---|---|
| *E04B 5/00* | (2006.01) |
| *C09J 9/00* | (2006.01) |
| *E04B 1/66* | (2006.01) |

(52) U.S. Cl.  
CPC ............... *E04B 1/665* (2013.01); *C09J 9/00* (2013.01); *C09J 2203/346* (2020.08); *C09J 2301/312* (2020.08)

(58) Field of Classification Search  
CPC ....... E04B 1/665; C09J 9/00; C09J 2203/346; C09J 2301/312  
See application file for complete search history.

(56) References Cited

U.S. PATENT DOCUMENTS

| | | | |
|---|---|---|---|
| 4,719,723 | A | 1/1988 | Van Wagoner |
| 5,126,189 | A | 6/1992 | Tanny et al. |
| 5,398,471 | A | 3/1995 | Spagnolo |
| 6,355,333 | B1 | 3/2002 | Waggoner et al. |
| 7,776,417 | B2 | 8/2010 | Mohseen et al. |
| 8,277,915 | B2 | 10/2012 | Couturier |
| 6,901,712 | C1 | 1/2013 | Lionel |
| 8,596,004 | B2 | 12/2013 | Coulton et al. |
| 8,946,101 | B2 | 2/2015 | Moulton et al. |
| 9,562,174 | B2 | 2/2017 | Russell |
| 9,783,980 | B2 | 10/2017 | Snyder et al. |
| 9,816,264 | B2 * | 11/2017 | Jablonka .............. B32B 37/1292 |
| 10,125,489 | B2 | 11/2018 | Snyder |

(Continued)

FOREIGN PATENT DOCUMENTS

| | | |
|---|---|---|
| CA | 2843707 C | 2/2017 |
| EP | 2313268 A1 | 4/2011 |

(Continued)

*Primary Examiner* — Basil S Katcheves  
(74) *Attorney, Agent, or Firm* — GREENBERG TRAURIG, LLP

(57) ABSTRACT

Water vapor permeable ribbed membranes and related methods are provided. A water vapor permeable ribbed membrane has a top surface and a bottom surface opposite the top surface. The water vapor permeable ribbed membrane comprises a plurality of ribs located on at least the bottom surface. An adhesive layer is located on the plurality of ribs. When the adhesive layer is adhered to a top surface of another water vapor permeable ribbed membrane, the adhesive layer has a peel adhesion of at least 1.5 lb/in, as measured according to ASTM D3330 (Method B). The water vapor permeable ribbed membrane has a water vapor permeability of greater than 10 perms, as measured according to ASTM E96B.

14 Claims, 5 Drawing Sheets

(56) References Cited

U.S. PATENT DOCUMENTS

| | | |
|---|---|---|
| 10,358,588 B2 | 7/2019 | Subotic et al. |
| 10,704,254 B2 | 7/2020 | Seabaugh et al. |
| 11,105,089 B2 | 8/2021 | Widenbrant et al. |
| 11,241,860 B2 | 2/2022 | Woodbridge et al. |
| 11,267,227 B2 | 3/2022 | Shake et al. |
| 11,365,328 B2 | 6/2022 | Seabaugh et al. |
| 2004/0180195 A1* | 9/2004 | Macuga .................. B32B 7/14 428/343 |
| 2004/0191459 A1* | 9/2004 | Driesten ................ C09J 7/385 428/40.1 |
| 2005/0186709 A1* | 8/2005 | Okawa .................... C09J 7/245 438/460 |
| 2005/0212427 A1* | 9/2005 | Buzoujima ........... B41F 35/003 313/582 |
| 2006/0009100 A1 | 1/2006 | McGroarty |
| 2006/0081322 A1* | 4/2006 | Wiercinski ............... C09J 7/40 156/249 |
| 2007/0166510 A1* | 7/2007 | Kato ........................ C09J 7/20 428/137 |
| 2008/0216430 A1* | 9/2008 | Gleeson ............. E04F 13/0864 52/506.1 |
| 2011/0045286 A1* | 2/2011 | Watanabe ................ C09J 7/38 428/343 |
| 2011/0088334 A1* | 4/2011 | O'Rourke ............... E04D 13/17 52/95 |
| 2011/0287216 A1* | 11/2011 | Groft ..................... B32B 3/266 428/131 |
| 2012/0114938 A1* | 5/2012 | Ooishi ................... C09J 133/10 428/355 R |
| 2012/0231223 A1* | 9/2012 | Lee .......................... C08J 7/18 428/161 |
| 2015/0037548 A1* | 2/2015 | Jablonka ................ E04B 1/625 156/291 |
| 2016/0024782 A1 | 1/2016 | Bess et al. |
| 2017/0210098 A1 | 7/2017 | Moore et al. |
| 2017/0356180 A1 | 12/2017 | Lesier et al. |
| 2019/0071824 A1* | 3/2019 | Robinson ............. E01C 11/106 |
| 2020/0347590 A1* | 11/2020 | Robinson ............. E04B 1/6812 |
| 2021/0113970 A1* | 4/2021 | Stainer ............... B01D 69/1411 |
| 2021/0381174 A1* | 12/2021 | Robinson ............. E01C 11/126 |
| 2022/0213354 A1 | 7/2022 | Kasitskaya et al. |

FOREIGN PATENT DOCUMENTS

| | | |
|---|---|---|
| WO | 1999/029978 A1 | 6/1999 |
| WO | 2015/179901 A1 | 12/2015 |
| WO | 2021/248177 A1 | 12/2021 |

\* cited by examiner

WATER VAPOR PERMEABLE RIBBED MEMBRANES AND RELATED SYSTEMS AND RELATED METHODS

CROSS-REFERENCE TO RELATED APPLICATIONS

The present application claims priority to and benefit of U.S. Provisional Patent Application No. 63/479,401, filed Jan. 11, 2023 and entitled "WATER VAPOR PERMEABLE RIBBED MEMBRANES AND RELATED METHODS," the entirety of which is herein incorporated by reference.

FIELD

This disclosure generally relates to water vapor permeable ribbed membranes for building applications, and related systems and related methods.

BACKGROUND

Building envelope membranes are useful as protective barriers between an outdoor environment and an interior of a building structure. As protective barriers, the building envelope membranes are designed to withstand numerous elements.

SUMMARY

Some embodiments relate to a building envelope system comprising a building frame structure, at least one panel member; a first water vapor permeable ribbed membrane; and a second water vapor permeable ribbed membrane. In some embodiments, the at least one panel member is secured to the building frame structure. In some embodiments, each of the first water vapor permeable ribbed membrane and the second water vapor permeable ribbed membrane comprises a top surface; a bottom surface opposite the top surface; a plurality of ribs located on at least the bottom surface; and an adhesive layer located on the plurality of ribs. In some embodiments, the bottom surface has a first edge portion, a second edge portion opposite the first edge portion, a third edge portion extending between the first edge portion and the second edge portion, and a fourth edge portion opposite the third edge portion and extending between the first edge portion and the second edge portion. In some embodiments, the adhesive layer of the first water vapor permeable ribbed membrane adheres the first edge portion of the first water vapor permeable ribbed membrane to the top surface of the second water vapor permeable ribbed membrane. In some embodiments, the adhesive layer of the first water vapor permeable ribbed membrane adheres the first water vapor permeable ribbed membrane to the at least one panel member. In some embodiments, the adhesive layer of the second water vapor permeable ribbed membrane adheres the second water vapor permeable ribbed membrane to the at least one panel member.

In some embodiments, the first water vapor permeable ribbed membrane directly contacts the second water vapor permeable ribbed membrane and the at least one panel member. In some embodiments, the second water vapor permeable ribbed membrane directly contacts thew first water vapor permeable ribbed membrane and the at least one panel member.

In some embodiments, the adhesive layer of the first water vapor permeable ribbed membrane covers an entire bottom surface of the first water vapor permeable ribbed membrane. In some embodiments, the adhesive layer of the second water vapor permeable ribbed membrane covers an entire bottom surface of the second water vapor permeable ribbed membrane.

In some embodiments, a portion of the plurality of ribs of the first water vapor permeable ribbed membrane is exposed through the adhesive layer of the first water vapor permeable ribbed membrane. In some embodiments, a portion of the plurality of ribs of the second water vapor permeable ribbed membrane is exposed through the adhesive layer of the second water vapor permeable ribbed membrane.

In some embodiments, a coat weight of the adhesive layer of the first water vapor permeable ribbed membrane is 200 GSM to 600 GSM. In some embodiments, a coat weight of the adhesive layer of the second water vapor permeable ribbed membrane is 200 GSM to 600 GSM.

In some embodiments, the plurality of ribs of the first water vapor permeable ribbed membrane is integral to the bottom surface of the first water vapor permeable ribbed membrane. In some embodiments, the plurality of ribs of the second water vapor permeable ribbed membrane is integral to the bottom surface of the second water vapor permeable ribbed membrane.

In some embodiments, each of the first water vapor permeable ribbed membrane and the second water vapor permeable ribbed membrane has a water vapor permeability of greater than 10 perms, as measured according to ASTM E96B.

In some embodiments, each of the first water vapor permeable ribbed membrane and the second water vapor permeable ribbed membrane has a water vapor permeability of 20 perms to 120 perms, as measured according to ASTM E96B.

In some embodiments, the portion of the adhesive layer that is adhered to the top surface of the second water vapor permeable ribbed membrane exhibits a peel adhesion of at least 3 lb/in, as measured according to ASTM D3330 (Method B).

In some embodiments, the portion of the adhesive layer that is adhered to the top surface of the second water vapor permeable ribbed membrane exhibits a peel adhesion of 4 lb/in to 25 lb/in, as measured according to ASTM D3330 (Method B).

Some embodiments relate to a water vapor permeable ribbed membrane comprising a top surface; a bottom surface opposite the top surface; a plurality of ribs located on at least the bottom surface; and an adhesive layer, wherein the adhesive layer is located on the plurality of ribs. In some embodiments, when the adhesive layer is adhered to a top surface of another water vapor permeable ribbed membrane, the adhesive layer has a peel adhesion of at least 1.5 lb/in, as measured according to ASTM D3330 (METHOD A). In some embodiments, the water vapor permeable ribbed membrane has a water vapor permeability of greater than 10 perms, as measured according to ASTM E96B.

In some embodiments, the adhesive layer directly contacts the plurality of ribs.

In some embodiments, the adhesive layer covers an entire bottom surface of the water vapor permeable ribbed membrane.

In some embodiments, a thickness of the adhesive layer is less than a rib height of the plurality of ribs.

In some embodiments, the plurality of ribs is integral to the bottom surface of the water vapor permeable ribbed membrane.

In some embodiments, the water vapor permeable ribbed membrane further comprises a removable liner, wherein the removable liner covers the adhesive layer.

Some embodiments relate to a method of installation. In some embodiments, the method of installation comprises obtaining a first water vapor permeable ribbed membrane and a second water vapor permeable ribbed membrane. In some embodiments, each of the first water vapor permeable ribbed membrane and the second water vapor permeable ribbed membrane comprises a top surface; a bottom surface opposite the top surface; and a plurality of ribs located on at least the bottom surface. In some embodiments, the bottom surface has a first edge portion, a second edge portion opposite the first edge portion, a third edge portion extending between the first edge portion and the second edge portion, and a fourth edge portion opposite the third edge portion and extending between the first edge portion and the second edge portion; an adhesive layer located on the plurality of ribs; and a removable liner adhered to the adhesive layer. In some embodiments, the method of installation comprises removing the removable liner from the first water vapor permeable ribbed membrane. In some embodiments, the method of installation comprises adhering the adhesive layer of the first water vapor permeable ribbed membrane to at least one panel member of a building frame structure. In some embodiments, the method of installation comprises removing the removable liner from the second water vapor permeable ribbed membrane. In some embodiments, the method of installation comprises adhering the adhesive layer of the second water vapor permeable ribbed membrane to the at least one panel member of the building frame structure; and to the top surface of the first water vapor permeable ribbed membrane.

In some embodiments, the first water vapor permeable ribbed membrane directly contacts the second water vapor permeable ribbed membrane and the at least one panel member. In some embodiments, the second water vapor permeable ribbed membrane directly contacts thew first water vapor permeable ribbed membrane and the at least one panel member.

In some embodiments, each of the first water vapor permeable ribbed membrane and the second water vapor permeable ribbed membrane has a water vapor permeability of greater than 10 perms, as measured according to ASTM E96B.

In some embodiments, the portion of the adhesive layer that is adhered to the top surface of the second water vapor permeable ribbed membrane exhibits a peel adhesion of at least 3 lb/in, as measured according to ASTM D3330 (Method B).

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
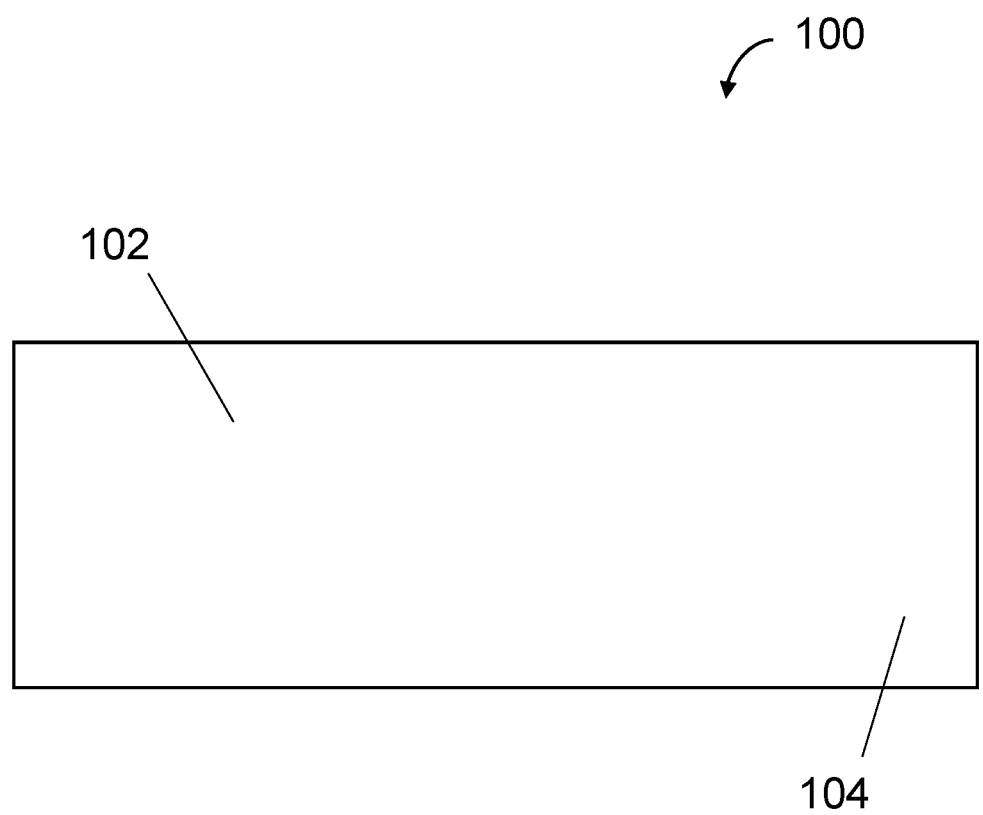
FIG. 1 illustrates a top view of an embodiment of a water vapor permeable ribbed membrane, according to some embodiments.

Water vapor permeable ribbed membranes for building envelope systems and related methods are provided. In some embodiments, a water vapor permeable ribbed membrane is provided, wherein the water vapor permeable ribbed membrane has at least one ribbed surface, and an adhesive layer located on the at least one ribbed surface. In some embodiments, the water vapor permeable ribbed membrane is water vapor permeable, even though the adhesive layer is not water vapor permeable. In some embodiments, the water vapor permeable ribbed membrane has a greater water vapor permeability than the ribbed membrane without the adhesive. In some embodiments, the water vapor permeable ribbed membrane has a greater water vapor permeability than the adhesive prior to the adhesive being applied to the ribbed membrane. In some embodiments, the water vapor permeable ribbed membrane, when the adhesive layer of the water vapor permeable ribbed membrane is adhered to another water vapor permeable ribbed membrane, maintains peel adhesion or exhibits enhanced peel adhesion, despite using a minimal amount of adhesive. In addition, in some embodiments, the water vapor permeable ribbed membrane is also useful in a building envelope system as an effective air and water barrier.

In some embodiments, the water vapor permeable ribbed membrane has a top surface, a bottom surface opposite the top surface, a first edge portion, a second edge portion opposite the first edge portion, a third edge portion extending between the first edge portion and the second edge portion, and a fourth edge portion opposite the third edge portion and extending between the first edge portion and the second edge portion. In some embodiments, at least one of the top surface, the bottom surface, or any combination thereof, is a ribbed surface.

In some embodiments, the adhesive layer comprises a continuous adhesive layer. In some embodiments, the adhesive layer is continuous when the adhesive layer does not comprise any isolated regions of adhesive (e.g., islands of adhesive, strips of adhesive, etc.). In some embodiments, the adhesive layer comprises a discontinuous adhesive layer. In some embodiments, the adhesive layer is discontinuous when the adhesive layer comprises at least one isolated region of adhesive (e.g., islands of adhesive, strips of adhesive, etc.). In some embodiments, the discontinuous adhesive layer may comprise isolated adhesive regions arranged in a pattern. Non-limiting examples of patterns include, for example and without limitation, at least one of a striped pattern, a checkered pattern, a dotted pattern, etc. In some embodiments, the adhesive layer is disposed on at least one ribbed surface of the water vapor permeable ribbed membrane, wherein the adhesive layer covers all of the at least one ribbed surface of the water vapor permeable ribbed membrane. In some embodiments, the adhesive layer is disposed on at least one ribbed surface of the water vapor permeable ribbed membrane, wherein the adhesive layer covers at least a portion of the at least one ribbed surface of the water vapor permeable ribbed membrane. In some embodiments, at least a portion of the ribs of the ribbed surface is exposed through the adhesive layer. In some embodiments, the ribs of the ribbed surface are covered in their entirety by the adhesive layer.

In some embodiments, the ribbed surface may be the bottom surface of the water vapor permeable ribbed membrane. In some embodiments, for example, a plurality of ribs is disposed on the bottom surface of the water vapor permeable ribbed membrane. In some embodiments, the plurality of ribs is located on the bottom surface of the water vapor permeable ribbed membrane. In some embodiments, the plurality of ribs is formed on or in the bottom surface of the water vapor permeable ribbed membrane. In some embodiments, the plurality of ribs is present on the bottom surface of the water vapor permeable ribbed membrane. In some embodiments, the plurality of ribs is integral to the bottom surface of the water vapor permeable ribbed membrane. In some embodiments, the plurality of ribs is not integral to the bottom surface of the water vapor permeable ribbed membrane. In some embodiments, the plurality of ribs is bonded to the bottom surface of the water vapor permeable ribbed membrane. In some embodiments, the plurality of ribs is adhered to the bottom surface of the water vapor permeable ribbed membrane. In some embodiments, the plurality of ribs is attached to the bottom surface of the water vapor permeable ribbed membrane.

In some embodiments, the ribbed surface may be the top surface of the water vapor permeable ribbed membrane. In some embodiments, for example, a plurality of ribs is disposed on the top surface of the water vapor permeable ribbed membrane. In some embodiments, the plurality of ribs is located on the top surface of the water vapor permeable ribbed membrane. In some embodiments, the plurality of ribs is formed on or in the top surface of the water vapor permeable ribbed membrane. In some embodiments, the plurality of ribs is present on the top surface of the water vapor permeable ribbed membrane. In some embodiments, the plurality of ribs is integral to the top surface of the water vapor permeable ribbed membrane. In some embodiments, the plurality of ribs is not integral to the top surface of the water vapor permeable ribbed membrane. In some embodiments, the plurality of ribs is bonded to the top surface of the water vapor permeable ribbed membrane. In some embodiments, the plurality of ribs is adhered to the top surface of the water vapor permeable ribbed membrane. In some embodiments, the plurality of ribs is attached to the top surface of the water vapor permeable ribbed membrane. In some embodiments, the top surface of the water vapor permeable ribbed membrane does not comprise any ribs. In some embodiments, the top surface of the water vapor permeable ribbed membrane is a non-ribbed surface. In some embodiments, the top surface of the water vapor permeable ribbed membrane is a flat surface or a substantially flat surface.

In some embodiments, the plurality of ribs comprises at least one of solid ribs, discrete broken ribs, continuous ribs, discontinuous ribs, angled ribs, linear ribs, longitudinal ribs extending substantially in a machine direction of the water vapor permeable ribbed membrane, lateral ribs extending substantially in a cross-machine direction of the water vapor permeable ribbed membrane, serrated ribs, battlemented ribs, curved ribs, sinusoidal ribs, ribs disposed in a solid or broken zig-zag-like configuration, grooves, channels, textured areas, embossments, dimples, porous ribs, non-porous ribs, mini ribs, cross-mini ribs, or any combination thereof. In some embodiments, the plurality of ribs is formed on or in the water vapor permeable ribbed membrane via at least one of extrusion, co-extrusion, embossing, etching, calendaring, printing, or any combination thereof.

In some embodiments, the plurality of ribs is equidistantly spaced apart. In some embodiments, a distance between each of the plurality of ribs is 1 mil to 50 mils. In some embodiments, the distance between each of the plurality of ribs is 1 mil to 45 mils. In some embodiments, the distance between each of the plurality of ribs is 1 mil to 40 mils. In some embodiments, the distance between each of the plurality of ribs is 1 mil to 35 mils. In some embodiments, the distance between each of the plurality of ribs is 1 mil to 30 mils. In some embodiments, the distance between each of the plurality of ribs is 1 mil to 25 mils. In some embodiments, the distance between each of the plurality of ribs is 1 mil to 24 mils. In some embodiments, the distance between each of the plurality of ribs is 1 mil to 23 mils. In some embodiments, the distance between each of the plurality of ribs is 1 mil to 22 mils. In some embodiments, the distance between each of the plurality of ribs is 1 mil to 21 mils. In some embodiments, the distance between each of the plurality of ribs is 1 mil to 20 mils. In some embodiments, the distance between each of the plurality of ribs is 1 mil to 19 mils. In some embodiments, the distance between each of the plurality of ribs is 1 mil to 18 mils. In some embodiments, the distance between each of the plurality of ribs is 1 mil to 17 mils. In some embodiments, the distance between each of the plurality of ribs is 1 mil to 16 mils. In some embodiments, the distance between each of the plurality of ribs is 1 mil to 15 mils. In some embodiments, the distance between each of the plurality of ribs is 1 mil to 14 mils. In some embodiments, the distance between each of the plurality of ribs is 1 mil to 13 mils. In some embodiments, the distance between each of the plurality of ribs is 1 mil to 12 mils. In some embodiments, the distance between each of the plurality of ribs is 1 mil to 11 mils. In some embodiments, the distance between each of the plurality of ribs is 1 mil to 10 mils. In some embodiments, the distance between each of the plurality of ribs is 1 mil to 9 mils. In some embodiments, the distance between each of the plurality of ribs is 1 mil to 8 mils. In some embodiments, the distance between each of the plurality of ribs is 1 mil to 7 mils. In some embodiments, the distance between each of the plurality of ribs is 1 mil to 6 mils. In some embodiments, the distance between each of the plurality of ribs is 1 mil to 5 mils.

In some embodiments, the distance between each of the plurality of ribs is 5 mil to 50 mils. In some embodiments, the distance between each of the plurality of ribs is 10 mil to 50 mils. In some embodiments, the distance between each of the plurality of ribs is 15 mil to 50 mils. In some embodiments, the distance between each of the plurality of ribs is 20 mil to 50 mils. In some embodiments, the distance between each of the plurality of ribs is 25 mil to 50 mils. In some embodiments, the distance between each of the plurality of ribs is 30 mil to 50 mils. In some embodiments, the distance between each of the plurality of ribs is 35 mil to 50 mils. In some embodiments, the distance between each of the plurality of ribs is 40 mil to 50 mils. In some embodiments, the distance between each of the plurality of ribs is 45 mil to 50 mils. In some embodiments, the distance between each of the plurality of ribs is 5 mils to 25 mils. In some embodiments, the distance between each of the plurality of ribs is 5 mils to 24 mils. In some embodiments, the distance between each of the plurality of ribs is 5 mils to 22 mils. In some embodiments, the distance between each of the plurality of ribs is 5 mils to 20 mils. In some embodiments, the distance between each of the plurality of ribs is 6 mils to 25 mils. In some embodiments, the distance between each of the plurality of ribs is 8 mils to 25 mils. In some embodiments, the distance between each of the plurality of ribs is 10 mils to 25 mils.

In some embodiments, the plurality of ribs is not equidistantly spaced apart.

In some embodiments, the water vapor permeable ribbed membrane comprises 1 to 1000 ribs on the ribbed surface. In some embodiments, the water vapor permeable ribbed membrane comprises 1 to 900 ribs on the ribbed surface. In some embodiments, the water vapor permeable ribbed membrane comprises 1 to 800 ribs on the ribbed surface. In some embodiments, the water vapor permeable ribbed membrane comprises 1 to 700 ribs on the ribbed surface. In some embodiments, the water vapor permeable ribbed membrane comprises 1 to 600 ribs on the ribbed surface. In some embodiments, the water vapor permeable ribbed membrane comprises 1 to 500 ribs on the ribbed surface. In some embodiments, the water vapor permeable ribbed membrane comprises 1 to 400 ribs on the ribbed surface. In some embodiments, the water vapor permeable ribbed membrane comprises 1 to 300 ribs on the ribbed surface. In some embodiments, the water vapor permeable ribbed membrane comprises 1 to 200 ribs on the ribbed surface. In some embodiments, the water vapor permeable ribbed membrane comprises 1 to 100 ribs on the ribbed surface.

In some embodiments, the water vapor permeable ribbed membrane comprises 100 to 1000 ribs on the ribbed surface. In some embodiments, the water vapor permeable ribbed membrane comprises 200 to 1000 ribs on the ribbed surface. In some embodiments, the water vapor permeable ribbed membrane comprises 300 to 1000 ribs on the ribbed surface. In some embodiments, the water vapor permeable ribbed membrane comprises 400 to 1000 ribs on the ribbed surface. In some embodiments, the water vapor permeable ribbed membrane comprises 500 to 1000 ribs on the ribbed surface. In some embodiments, the water vapor permeable ribbed membrane comprises 600 to 1000 ribs on the ribbed surface. In some embodiments, the water vapor permeable ribbed membrane comprises 700 to 1000 ribs on the ribbed surface. In some embodiments, the water vapor permeable ribbed membrane comprises 800 to 1000 ribs on the ribbed surface. In some embodiments, the water vapor permeable ribbed membrane comprises 900 to 1000 ribs on the ribbed surface.

In some embodiments, the water vapor permeable ribbed membrane comprises 1 to 90 ribs on the ribbed surface. In some embodiments, the water vapor permeable ribbed membrane comprises 1 to 80 ribs on the ribbed surface. In some embodiments, the water vapor permeable ribbed membrane comprises 1 to 70 ribs on the ribbed surface. In some embodiments, the water vapor permeable ribbed membrane comprises 1 to 60 ribs on the ribbed surface. In some embodiments, the water vapor permeable ribbed membrane comprises 1 to 50 ribs on the ribbed surface. In some embodiments, the water vapor permeable ribbed membrane comprises 1 to 40 ribs on the ribbed surface. In some embodiments, the water vapor permeable ribbed membrane comprises 1 to 30 ribs on the ribbed surface. In some embodiments, the water vapor permeable ribbed membrane comprises 1 to 20 ribs on the ribbed surface. In some embodiments, the water vapor permeable ribbed membrane comprises 1 to 10 ribs on the ribbed surface. In some embodiments, the water vapor permeable ribbed membrane comprises 1 to 5 ribs on the ribbed surface.

In some embodiments, the water vapor permeable ribbed membrane comprises 10 to 90 ribs on the ribbed surface. In some embodiments, the water vapor permeable ribbed membrane comprises 20 to 90 ribs on the ribbed surface. In some embodiments, the water vapor permeable ribbed membrane comprises 30 to 90 ribs on the ribbed surface. In some embodiments, the water vapor permeable ribbed membrane comprises 40 to 90 ribs on the ribbed surface. In some embodiments, the water vapor permeable ribbed membrane comprises 50 to 90 ribs on the ribbed surface. In some embodiments, the water vapor permeable ribbed membrane comprises 60 to 90 ribs on the ribbed surface. In some embodiments, the water vapor permeable ribbed membrane comprises 70 to 90 ribs on the ribbed surface. In some embodiments, the water vapor permeable ribbed membrane comprises 80 to 90 ribs on the ribbed surface.

In some embodiments, the number of ribs on the ribbed surface is the number of ribs per unit surface area, wherein the unit surface area is square inches. In some embodiments, the number of ribs on the ribbed surface is the number of ribs per unit surface area, wherein the unit surface area is square feet.

In some embodiments, the plurality of ribs has a rib height of 1 mil to 100 mils, wherein the rib height is measured from a surface of the microporous membrane to a top of the rib(s). In some embodiments, the plurality of ribs has a rib height of 1 mil to 90 mils. In some embodiments, the plurality of ribs has a rib height of 1 mil to 80 mils. In some embodiments, the plurality of ribs has a rib height of 1 mil to 70 mils. In some embodiments, the plurality of ribs has a rib height of 1 mil to 60 mils. In some embodiments, the plurality of ribs has a rib height of 1 mil to 50 mils. In some embodiments, the plurality of ribs has a rib height of 1 mil to 40 mils. In some embodiments, the plurality of ribs has a rib height of 1 mil to 30 mils. In some embodiments, the plurality of ribs has a rib height of 1 mil to 20 mils. In some embodiments, the plurality of ribs has a rib height of 1 mil to 19 mils. In some embodiments, the plurality of ribs has a rib height of 1 mil to 18 mils. In some embodiments, the plurality of ribs has a rib height of 1 mil to 17 mils. In some embodiments, the plurality of ribs has a rib height of 1 mil to 16 mils. In some embodiments, the plurality of ribs has a rib height of 1 mil to 15 mils. In some embodiments, the plurality of ribs has a rib height of 1 mil to 14 mils. In some embodiments, the plurality of ribs has a rib height of 1 mil to 13 mils. In some embodiments, the plurality of ribs has a rib height of 1 mil to 12 mils. In some embodiments, the plurality of ribs has a rib height of 1 mil to 11 mils. In some embodiments, the plurality of ribs has a rib height of 1 mil to 10 mils. In some embodiments, the plurality of ribs has a rib height of 1 mil to 9 mils. In some embodiments, the plurality of ribs has a rib height of 1 mil to 8 mils. In some embodiments, the plurality of ribs has a rib height of 1 mil to 7 mils. In some embodiments, the plurality of ribs has a rib height of 1 mil to 6 mils. In some embodiments, the plurality of ribs has a rib height of 1 mil to 5 mils. In some embodiments, the plurality of ribs has a rib height of 1 mil to 4 mils. In some embodiments, the plurality of ribs has a rib height of 1 mil to 3 mils. In some embodiments, the plurality of ribs has a rib height of 1 mil to 2 mils.

In some embodiments, the plurality of ribs has a rib height of 2 mil to 100 mils. In some embodiments, the plurality of ribs has a rib height of 3 mil to 100 mils. In some embodiments, the plurality of ribs has a rib height of 4 mil to 100 mils. In some embodiments, the plurality of ribs has a rib height of 5 mil to 100 mils. In some embodiments, the plurality of ribs has a rib height of 6 mil to 100 mils. In some embodiments, the plurality of ribs has a rib height of 7 mil to 100 mils. In some embodiments, the plurality of ribs has a rib height of 8 mil to 100 mils. In some embodiments, the plurality of ribs has a rib height of 9 mil to 100 mils. In some embodiments, the plurality of ribs has a rib height of 10 mil to 100 mils. In some embodiments, the plurality of ribs has a rib height of 20 mil to 100 mils. In some embodiments, the plurality of ribs has a rib height of 30 mil to 100 mils. In some embodiments, the plurality of ribs has a rib height of 40 mil to 100 mils. In some embodiments, the plurality of ribs has a rib height of 50 mil to 100 mils. In some embodiments, the plurality of ribs has a rib height of 60 mil to 100 mils. In some embodiments, the plurality of ribs has a rib height of 70 mil to 100 mils. In some embodiments, the plurality of ribs has a rib height of 80 mil to 100 mils. In some embodiments, the plurality of ribs has a rib height of 90 mil to 100 mils.

In some embodiments, the water vapor permeable ribbed membrane comprises a membrane. In some embodiments, the water vapor permeable ribbed membrane comprises a ribbed membrane. In some embodiments, the membrane is a microporous membrane. In some embodiments, the microporous membrane has an average pore size of 0.1 microns to 5 microns. In some embodiments, the microporous membrane has an average pore size of 0.1 microns to 4.5 microns. In some embodiments, the microporous membrane has an average pore size of 0.1 microns to 4 microns. In some embodiments, the microporous membrane has an average pore size of 0.1 microns to 3.5 microns. In some embodiments, the microporous membrane has an average pore size of 0.1 microns to 3 microns. In some embodiments, the microporous membrane has an average pore size of 0.1 microns to 2.5 microns. In some embodiments, the microporous membrane has an average pore size of 0.1 microns to 2 microns. In some embodiments, the microporous membrane has an average pore size of 0.1 microns to 1.5 microns. In some embodiments, the microporous membrane has an average pore size of 0.1 microns to 1 microns. In some embodiments, the microporous membrane has an average pore size of 0.1 microns to 0.9 microns. In some embodiments, the microporous membrane has an average pore size of 0.1 microns to 0.8 microns. In some embodiments, the microporous membrane has an average pore size of 0.1 microns to 0.7 microns. In some embodiments, the microporous membrane has an average pore size of 0.1 microns to 0.6 microns. In some embodiments, the microporous membrane has an average pore size of 0.1 microns to 0.5 microns. In some embodiments, the microporous membrane has an average pore size of 0.1 microns to 0.4 microns. In some embodiments, the microporous membrane has an average pore size of 0.1 microns to 0.3 microns. In some embodiments, the microporous membrane has an average pore size of 0.1 microns to 0.2 microns.

In some embodiments, the microporous membrane has an average pore size of 0.2 microns to 5 microns. In some embodiments, the microporous membrane has an average pore size of 0.3 microns to 5 microns. In some embodiments, the microporous membrane has an average pore size of 0.4 microns to 5 microns. In some embodiments, the microporous membrane has an average pore size of 0.5 microns to 5 microns. In some embodiments, the microporous membrane has an average pore size of 0.6 microns to 5 microns. In some embodiments, the microporous membrane has an average pore size of 0.7 microns to 5 microns. In some embodiments, the microporous membrane has an average pore size of 0.8 microns to 5 microns. In some embodiments, the microporous membrane has an average pore size of 0.9 microns to 5 microns. In some embodiments, the microporous membrane has an average pore size of 1 micron to 5 microns. In some embodiments, the microporous membrane has an average pore size of 1.5 microns to 5 microns. In some embodiments, the microporous membrane has an average pore size of 2 microns to 5 microns. In some embodiments, the microporous membrane has an average pore size of 2.5 microns to 5 microns. In some embodiments, the microporous membrane has an average pore size of 3 microns to 5 microns. In some embodiments, the microporous membrane has an average pore size of 3.5 microns to 5 microns. In some embodiments, the microporous membrane has an average pore size of 4 microns to 5 microns. In some embodiments, the microporous membrane has an average pore size of 4.5 microns to 5 microns.

In some embodiments, the microporous membrane has an average pore size of 0.2 microns to 1 microns. In some embodiments, the microporous membrane has an average pore size of 0.3 microns to 1 microns. In some embodiments, the microporous membrane has an average pore size of 0.4 microns to 1 microns. In some embodiments, the microporous membrane has an average pore size of 0.5 microns to 1 microns. In some embodiments, the microporous membrane has an average pore size of 0.6 microns to 1 microns. In some embodiments, the microporous membrane has an average pore size of 0.7 microns to 1 microns. In some embodiments, the microporous membrane has an average pore size of 0.8 microns to 1 microns. In some embodiments, the microporous membrane has an average pore size of 0.9 microns to 1 microns.

In some embodiments, the membrane has a thickness. In some embodiments, the thickness includes the height of the plurality of ribs. In some embodiments, the thickness does not include the height of the plurality of ribs. In some embodiments, the membrane has a thickness of 1 mil to 200 mils. In some embodiments, the membrane has a thickness of 1 mil to 190 mils. In some embodiments, the membrane has a thickness of 1 mil to 180 mils. In some embodiments, the membrane has a thickness of 1 mil to 170 mils. In some embodiments, the membrane has a thickness of 1 mil to 160 mils. In some embodiments, the membrane has a thickness of 1 mil to 150 mils. In some embodiments, the membrane has a thickness of 1 mil to 140 mils. In some embodiments, the membrane has a thickness of 1 mil to 130 mils. In some embodiments, the membrane has a thickness of 1 mil to 120 mils. In some embodiments, the membrane has a thickness of 1 mil to 110 mils.

In some embodiments, the membrane has a thickness of 1 mil to 100 mils. In some embodiments, the membrane has a thickness of 1 mil to 90 mils. In some embodiments, the membrane has a thickness of 1 mil to 80 mils. In some embodiments, the membrane has a thickness of 1 mil to 70 mils. In some embodiments, the membrane has a thickness of 1 mil to 60 mils. In some embodiments, the membrane has a thickness of 1 mil to 50 mils. In some embodiments, the membrane has a thickness of 1 mil to 40 mils. In some embodiments, the membrane has a thickness of 1 mil to 30 mils. In some embodiments, the membrane has a thickness of 1 mil to 20 mils. In some embodiments, the membrane has a thickness of 1 mil to 19 mils. In some embodiments, the membrane has a thickness of 1 mil to 18 mils. In some embodiments, the membrane has a thickness of 1 mil to 17 mils. In some embodiments, the membrane has a thickness of 1 mil to 16 mils. In some embodiments, the membrane has a thickness of 1 mil to 15 mils. In some embodiments, the membrane has a thickness of 1 mil to 14 mils. In some embodiments, the membrane has a thickness of 1 mil to 13 mils. In some embodiments, the membrane has a thickness of 1 mil to 12 mils. In some embodiments, the membrane has a thickness of 1 mil to 11 mils. In some embodiments, the membrane has a thickness of 1 mil to 10 mils. In some embodiments, the membrane has a thickness of 1 mil to 9 mils. In some embodiments, the membrane has a thickness of 1 mil to 8 mils. In some embodiments, the membrane has a thickness of 1 mil to 7 mils. In some embodiments, the membrane has a thickness of 1 mil to 6 mils. In some embodiments, the membrane has a thickness of 1 mil to 5 mils. In some embodiments, the membrane has a thickness of 1 mil to 4 mils. In some embodiments, the membrane has a thickness of 1 mil to 3 mils. In some embodiments, the membrane has a thickness of 1 mil to 2 mils.

In some embodiments, the membrane has a thickness of 10 mil to 200 mils. In some embodiments, the membrane has a thickness of 20 mil to 200 mils. In some embodiments, the membrane has a thickness of 30 mil to 200 mils. In some embodiments, the membrane has a thickness of 40 mil to 200 mils. In some embodiments, the membrane has a thickness of 50 mil to 200 mils. In some embodiments, the membrane has a thickness of 60 mil to 200 mils. In some embodiments, the membrane has a thickness of 70 mil to 200 mils. In some embodiments, the membrane has a thickness of 80 mil to 200 mils. In some embodiments, the membrane has a thickness of 90 mil to 200 mils.

In some embodiments, the membrane has a thickness of 100 mil to 200 mils. In some embodiments, the membrane has a thickness of 110 mil to 200 mils. In some embodiments, the membrane has a thickness of 120 mil to 200 mils. In some embodiments, the membrane has a thickness of 130 mil to 200 mils. In some embodiments, the membrane has a thickness of 140 mil to 200 mils. In some embodiments, the membrane has a thickness of 150 mil to 200 mils. In some embodiments, the membrane has a thickness of 160 mil to 200 mils. In some embodiments, the membrane has a thickness of 170 mil to 200 mils. In some embodiments, the membrane has a thickness of 180 mil to 200 mils. In some embodiments, the membrane has a thickness of 190 mil to 200 mils.

In some embodiments, a height of the membrane includes the height of the ribs. In some embodiments, the membrane, including the ribs, has a thickness of 1 mil to 50 mils. In some embodiments, the membrane, including the ribs, has a thickness of 1 mil to 45 mils. In some embodiments, the membrane, including the ribs, has a thickness of 1 mil to 40 mils. In some embodiments, the membrane, including the ribs, has a thickness of 1 mil to 35 mils. In some embodiments, the membrane, including the ribs, has a thickness of 1 mil to 30 mils. In some embodiments, the membrane, including the ribs, has a thickness of 1 mil to 25 mils. In some embodiments, the membrane, including the ribs, has a thickness of 1 mil to 20 mils. In some embodiments, the membrane, including the ribs, has a thickness of 1 mil to 19 mils. In some embodiments, the membrane, including the ribs, has a thickness of 1 mil to 18 mils. In some embodiments, the membrane, including the ribs, has a thickness of 1 mil to 17 mils. In some embodiments, the membrane, including the ribs, has a thickness of 1 mil to 16 mils. In some embodiments, the membrane, including the ribs, has a thickness of 1 mil to 15 mils. In some embodiments, the membrane, including the ribs, has a thickness of 1 mil to 14 mils. In some embodiments, the membrane, including the ribs, has a thickness of 1 mil to 13 mils. In some embodiments, the membrane, including the ribs, has a thickness of 1 mil to 12 mils. In some embodiments, the membrane, including the ribs, has a thickness of 1 mil to 11 mils. In some embodiments, the membrane, including the ribs, has a thickness of 1 mil to 10 mils. In some embodiments, the membrane, including the ribs, has a thickness of 1 mil to 9 mils. In some embodiments, the membrane, including the ribs, has a thickness of 1 mil to 8 mils. In some embodiments, the membrane, including the ribs, has a thickness of 1 mil to 7 mils. In some embodiments, the membrane, including the ribs, has a thickness of 1 mil to 6 mils. In some embodiments, the membrane, including the ribs, has a thickness of 1 mil to 5 mils. In some embodiments, the membrane, including the ribs, has a thickness of 1 mil to 4 mils. In some embodiments, the membrane, including the ribs, has a thickness of 1 mil to 3 mils. In some embodiments, the membrane, including the ribs, has a thickness of 1 mil to 2 mils.

In some embodiments, the membrane, including the ribs, has a thickness of 1 mil to 25 mils. In some embodiments, the membrane, including the ribs, has a thickness of 2 mils to 25 mils. In some embodiments, the membrane, including the ribs, has a thickness of 3 mils to 25 mils. In some embodiments, the membrane, including the ribs, has a thickness of 4 mils to 25 mils. In some embodiments, the membrane, including the ribs, has a thickness of 5 mils to 25 mils. In some embodiments, the membrane, including the ribs, has a thickness of 6 mils to 25 mils. In some embodiments, the membrane, including the ribs, has a thickness of 7 mils to 25 mils. In some embodiments, the membrane, including the ribs, has a thickness of 8 mils to 25 mils. In some embodiments, the membrane, including the ribs, has a thickness of 9 mils to 25 mils. In some embodiments, the membrane, including the ribs, has a thickness of 10 mils to 25 mils. In some embodiments, the membrane, including the ribs, has a thickness of 11 mils to 25 mils. In some embodiments, the membrane, including the ribs, has a thickness of 12 mils to 25 mils. In some embodiments, the membrane, including the ribs, has a thickness of 13 mils to 25 mils. In some embodiments, the membrane, including the ribs, has a thickness of 14 mils to 25 mils. In some embodiments, the membrane, including the ribs, has a thickness of 15 mils to 25 mils. In some embodiments, the membrane, including the ribs, has a thickness of 16 mils to 25 mils. In some embodiments, the membrane, including the ribs, has a thickness of 17 mils to 25 mils. In some embodiments, the membrane, including the ribs, has a thickness of 18 mils to 25 mils. In some embodiments, the membrane, including the ribs, has a thickness of 19 mils to 25 mils. In some embodiments, the membrane, including the ribs, has a thickness of 20 mils to 25 mils. In some embodiments, the membrane, including the ribs, has a thickness of 21 mils to 25 mils. In some embodiments, the membrane, including the ribs, has a thickness of 22 mils to 25 mils. In some embodiments, the membrane, including the ribs, has a thickness of 23 mils to 25 mils. In some embodiments, the membrane, including the ribs, has a thickness of 24 mils to 25 mils.

In some embodiments, the membrane, excluding the ribs, has a thickness of 1 mil to 20 mils. In some embodiments, the membrane, excluding the ribs, has a thickness of 1 mil to 19 mils. In some embodiments, the membrane, excluding the ribs, has a thickness of 1 mil to 18 mils. In some embodiments, the membrane, excluding the ribs, has a thickness of 1 mil to 17 mils. In some embodiments, the membrane, excluding the ribs, has a thickness of 1 mil to 16 mils. In some embodiments, the membrane, excluding the ribs, has a thickness of 1 mil to 15 mils. In some embodiments, the membrane, excluding the ribs, has a thickness of 1 mil to 14 mils. In some embodiments, the membrane, excluding the ribs, has a thickness of 1 mil to 13 mils. In some embodiments, the membrane, excluding the ribs, has a thickness of 1 mil to 12 mils. In some embodiments, the membrane, excluding the ribs, has a thickness of 1 mil to 11 mils. In some embodiments, the membrane, excluding the ribs, has a thickness of 1 mil to 10 mils. In some embodiments, the membrane, excluding the ribs, has a thickness of 1 mil to 9 mils. In some embodiments, the membrane, excluding the ribs, has a thickness of 1 mil to 8 mils. In some embodiments, the membrane, excluding the ribs, has a thickness of 1 mil to 7 mils. In some embodiments, the membrane, excluding the ribs, has a thickness of 1 mil to 6 mils. In some embodiments, the membrane, excluding the ribs, has a thickness of 1 mil to 5 mils. In some embodiments, the membrane, excluding the ribs, has a thickness of 1 mil to 4 mils. In some embodiments, the membrane, excluding the ribs, has a thickness of 1 mil to 3 mils. In some embodiments, the membrane, excluding the ribs, has a thickness of 1 mil to 2 mils.

In some embodiments, the membrane, excluding the ribs, has a thickness of 2 mils to 20 mils. In some embodiments, the membrane, excluding the ribs, has a thickness of 3 mils to 20 mils. In some embodiments, the membrane, excluding the ribs, has a thickness of 4 mils to 20 mils. In some embodiments, the membrane, excluding the ribs, has a thickness of 5 mils to 20 mils. In some embodiments, the membrane, excluding the ribs, has a thickness of 6 mils to 20 mils. In some embodiments, the membrane, excluding the ribs, has a thickness of 7 mils to 20 mils. In some embodiments, the membrane, excluding the ribs, has a thickness of 8 mils to 20 mils. In some embodiments, the membrane, excluding the ribs, has a thickness of 9 mils to 20 mils. In some embodiments, the membrane, excluding the ribs, has a thickness of 10 mils to 20 mils. In some embodiments, the membrane, excluding the ribs, has a thickness of 11 mils to 20 mils. In some embodiments, the membrane, excluding the ribs, has a thickness of 12 mils to 20 mils. In some embodiments, the membrane, excluding the ribs, has a thickness of 13 mils to 20 mils. In some embodiments, the membrane, excluding the ribs, has a thickness of 14 mils to 20 mils. In some embodiments, the membrane, excluding the ribs, has a thickness of 15 mils to 20 mils. In some embodiments, the membrane, excluding the ribs, has a thickness of 16 mils to 20 mils. In some embodiments, the membrane, excluding the ribs, has a thickness of 17 mils to 20 mils. In some embodiments, the membrane, excluding the ribs, has a thickness of 18 mils to 20 mils. In some embodiments, the membrane, excluding the ribs, has a thickness of 19 mils to 20 mils.

In some embodiments, the water vapor permeable ribbed membrane has a thickness of 2 mils to 300 mils, wherein the thickness of the water vapor permeable ribbed membrane includes the microporous membrane thickness and rib height. In some embodiments, the water vapor permeable ribbed membrane has a thickness of 2 mils to 290 mils. In some embodiments, the water vapor permeable ribbed membrane has a thickness of 2 mils to 280 mils. In some embodiments, the water vapor permeable ribbed membrane has a thickness of 2 mils to 270 mils. In some embodiments, the water vapor permeable ribbed membrane has a thickness of 2 mils to 260 mils. In some embodiments, the water vapor permeable ribbed membrane has a thickness of 2 mils to 250 mils. In some embodiments, the water vapor permeable ribbed membrane has a thickness of 2 mils to 240 mils. In some embodiments, the water vapor permeable ribbed membrane has a thickness of 2 mils to 230 mils. In some embodiments, the water vapor permeable ribbed membrane has a thickness of 2 mils to 220 mils. In some embodiments, the water vapor permeable ribbed membrane has a thickness of 2 mils to 210 mils.

In some embodiments, the water vapor permeable ribbed membrane has a thickness of 2 mils to 200 mils. In some embodiments, the water vapor permeable ribbed membrane has a thickness of 2 mils to 190 mils. In some embodiments, the water vapor permeable ribbed membrane has a thickness of 2 mils to 180 mils. In some embodiments, the water vapor permeable ribbed membrane has a thickness of 2 mils to 170 mils. In some embodiments, the water vapor permeable ribbed membrane has a thickness of 2 mils to 160 mils. In some embodiments, the water vapor permeable ribbed membrane has a thickness of 2 mils to 150 mils. In some embodiments, the water vapor permeable ribbed membrane has a thickness of 2 mils to 140 mils. In some embodiments, the water vapor permeable ribbed membrane has a thickness of 2 mils to 130 mils. In some embodiments, the water vapor permeable ribbed membrane has a thickness of 2 mils to 120 mils. In some embodiments, the water vapor permeable ribbed membrane has a thickness of 2 mils to 110 mils.

In some embodiments, the water vapor permeable ribbed membrane has a thickness of 2 mils to 100 mils. In some embodiments, the water vapor permeable ribbed membrane has a thickness of 2 mils to 90 mils. In some embodiments, the water vapor permeable ribbed membrane has a thickness of 2 mils to 80 mils. In some embodiments, the water vapor permeable ribbed membrane has a thickness of 2 mils to 70 mils. In some embodiments, the water vapor permeable ribbed membrane has a thickness of 2 mils to 60 mils. In some embodiments, the water vapor permeable ribbed membrane has a thickness of 2 mils to 50 mils. In some embodiments, the water vapor permeable ribbed membrane has a thickness of 2 mils to 40 mils. In some embodiments, the water vapor permeable ribbed membrane has a thickness of 2 mils to 30 mils. In some embodiments, the water vapor permeable ribbed membrane has a thickness of 2 mils to 20 mils. In some embodiments, the water vapor permeable ribbed membrane has a thickness of 2 mils to 10 mils.

In some embodiments, the water vapor permeable ribbed membrane has a thickness to 10 mils to 300 mils. In some embodiments, the water vapor permeable ribbed membrane has a thickness to 20 mils to 300 mils. In some embodiments, the water vapor permeable ribbed membrane has a thickness to 30 mils to 300 mils. In some embodiments, the water vapor permeable ribbed membrane has a thickness to 40 mils to 300 mils. In some embodiments, the water vapor permeable ribbed membrane has a thickness to 50 mils to 300 mils. In some embodiments, the water vapor permeable ribbed membrane has a thickness to 60 mils to 300 mils. In some embodiments, the water vapor permeable ribbed membrane has a thickness to 70 mils to 300 mils. In some embodiments, the water vapor permeable ribbed membrane has a thickness to 80 mils to 300 mils. In some embodiments, the water vapor permeable ribbed membrane has a thickness to 90 mils to 300 mils. In some embodiments, the water vapor permeable ribbed membrane has a thickness to 100 mils to 300 mils.

In some embodiments, the water vapor permeable ribbed membrane has a thickness to 110 mils to 300 mils. In some embodiments, the water vapor permeable ribbed membrane has a thickness to 120 mils to 300 mils. In some embodiments, the water vapor permeable ribbed membrane has a thickness to 130 mils to 300 mils. In some embodiments, the water vapor permeable ribbed membrane has a thickness to 140 mils to 300 mils. In some embodiments, the water vapor permeable ribbed membrane has a thickness to 150 mils to 300 mils. In some embodiments, the water vapor permeable ribbed membrane has a thickness to 160 mils to 300 mils. In some embodiments, the water vapor permeable ribbed membrane has a thickness to 170 mils to 300 mils. In some embodiments, the water vapor permeable ribbed membrane has a thickness to 180 mils to 300 mils. In some embodiments, the water vapor permeable ribbed membrane has a thickness to 190 mils to 300 mils. In some embodiments, the water vapor permeable ribbed membrane has a thickness to 200 mils to 300 mils.

In some embodiments, the water vapor permeable ribbed membrane has a thickness to 210 mils to 300 mils. In some embodiments, the water vapor permeable ribbed membrane has a thickness to 220 mils to 300 mils. In some embodiments, the water vapor permeable ribbed membrane has a thickness to 230 mils to 300 mils. In some embodiments, the water vapor permeable ribbed membrane has a thickness to 240 mils to 300 mils. In some embodiments, the water vapor permeable ribbed membrane has a thickness to 250 mils to 300 mils. In some embodiments, the water vapor permeable ribbed membrane has a thickness to 260 mils to 300 mils. In some embodiments, the water vapor permeable ribbed membrane has a thickness to 270 mils to 300 mils. In some embodiments, the water vapor permeable ribbed membrane has a thickness to 280 mils to 300 mils. In some embodiments, the water vapor permeable ribbed membrane has a thickness to 290 mils to 300 mils.

In some embodiments, the adhesive layer comprises at least one of a pressure sensitive adhesive, a hot melt adhesive, a solvent based adhesive, a water based adhesive, or a polymer based adhesive. In some embodiments, the hot melt adhesive comprises at least one of butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a rosin, a natural wax, a petroleum wax, an oil, bitumen, or any combination thereof. In some embodiments, the solvent based adhesive comprises, either dispersed or dissolved in a solvent, at least one of butyl rubber, styrene-butadiene-styrene (SBS) polymer, styrene-isoprene-styrene (SIS) polymer, a styrene butadiene rubber (SBR), a styrene-ethylene-butadiene-styrene (SEBS) polymer, ethylene vinyl acetate (EVA), a resin, a rosin, a natural wax, a petroleum wax, an oil, bitumen, or any combination thereof. In some embodiments, the water based adhesive comprises, in an emulsion, at least one polymeric material. In some embodiments, the at least one polymeric material comprises at least one of a vinyl acetate polymer, an acrylic polymer, a vinyl acetate acrylic copolymer, or any combination thereof. In some embodiments, the polymeric material comprises at least one of vinyl acetate acrylic, ethylene vinyl acetate as well as styrene acrylic, vinyl chloride acrylic, vinyl versatate, or any combination thereof. In some embodiments, the adhesive layer comprises at least one of an epoxy adhesive, a polyurethane adhesive, an acrylic adhesive, an ultraviolet radiation cured adhesive, a silicone-containing adhesive, or any combination thereof. In some embodiments, the adhesive layer comprises at least one of a silyl modified polymer, a silane terminated polymer, a natural rubber, a polyolefin polymer, a poly-alpha-olefin (APAO/APO) polymer, a polyamide polyvinyl acetate, a polyvinyl acetate, a polyvinyl alcohol, an ethylene vinyl acetate, a polyamide, a polyester, a polyester amide, an ethylene acrylic, or any combination thereof.

In some embodiments, the adhesive layer comprises a continuous adhesive layer. In some embodiments, the adhesive layer comprises a non-continuous adhesive layer. For example, in some embodiments, the adhesive layer comprises a plurality of adhesive islands located on the bottom surface of the water vapor permeable ribbed membrane.

In some embodiments, the adhesive layer is disposed on the plurality of ribs. In some embodiments, the adhesive layer is located on the plurality of ribs. In some embodiments, the adhesive layer is present on the plurality of ribs. In some embodiments, the adhesive layer is provided on the plurality of ribs. In some embodiments, the adhesive layer is adhered to the plurality of ribs. In some embodiments, the adhesive layer covers the plurality of ribs. In some embodiments, the adhesive layer directly contacts the plurality of ribs. In some embodiments, the adhesive layer is a coating on the plurality of ribs.

In some embodiments, the adhesive layer covers at least 50% of the plurality of ribs. In some embodiments, the adhesive layer covers at least 55% of the plurality of ribs. In some embodiments, the adhesive layer covers at least 60% of the plurality of ribs. In some embodiments, the adhesive layer covers at least 65% of the plurality of ribs. In some embodiments, the adhesive layer covers at least 70% of the plurality of ribs. In some embodiments, the adhesive layer covers at least 75% of the plurality of ribs. In some embodiments, the adhesive layer covers at least 80% of the plurality of ribs. In some embodiments, the adhesive layer covers at least 85% of the plurality of ribs. In some embodiments, the adhesive layer covers at least 90% of the plurality of ribs. In some embodiments, the adhesive layer covers at least 95% of the plurality of ribs. In some embodiments, the adhesive layer covers at least 99% of the plurality of ribs.

In some embodiments, the adhesive layer covers 50% to 99% of the plurality of ribs. In some embodiments, the adhesive layer covers 50% to 95% of the plurality of ribs. In some embodiments, the adhesive layer covers 50% to 90% of the plurality of ribs. In some embodiments, the adhesive layer covers 50% to 85% of the plurality of ribs. In some embodiments, the adhesive layer covers 50% to 80% of the plurality of ribs. In some embodiments, the adhesive layer covers 50% to 75% of the plurality of ribs. In some embodiments, the adhesive layer covers 50% to 70% of the plurality of ribs. In some embodiments, the adhesive layer covers 50% to 65% of the plurality of ribs. In some embodiments, the adhesive layer covers 50% to 60% of the plurality of ribs. In some embodiments, the adhesive layer covers 50% to 55% of the plurality of ribs.

In some embodiments, the adhesive layer covers 55% to 99% of the plurality of ribs. In some embodiments, the adhesive layer covers 60% to 99% of the plurality of ribs. In some embodiments, the adhesive layer covers 65% to 99% of the plurality of ribs. In some embodiments, the adhesive layer covers 70% to 99% of the plurality of ribs. In some embodiments, the adhesive layer covers 75% to 99% of the plurality of ribs. In some embodiments, the adhesive layer covers 80% to 99% of the plurality of ribs. In some embodiments, the adhesive layer covers 85% to 99% of the plurality of ribs. In some embodiments, the adhesive layer covers 90% to 99% of the plurality of ribs. In some embodiments, the adhesive layer covers 95% to 99% of the plurality of ribs.

In some embodiments, the adhesive layer covers the plurality of ribs in its entirety.

In some embodiments, the adhesive layer is disposed on the bottom surface. In some embodiments, the adhesive layer is located on the bottom surface. In some embodiments, the adhesive layer is present on the bottom surface. In some embodiments, the adhesive layer is provided on the bottom surface. In some embodiments, the adhesive layer is adhered to the bottom surface. In some embodiments, the adhesive layer covers the bottom surface. In some embodiments, the adhesive layer directly contacts the bottom surface. In some embodiments, the adhesive layer is a coating on the bottom surface.

In some embodiments, the adhesive layer covers at least 50% of the bottom surface. In some embodiments, the adhesive layer covers at least 55% of the bottom surface. In some embodiments, the adhesive layer covers at least 60% of the bottom surface. In some embodiments, the adhesive layer covers at least 65% of the bottom surface. In some embodiments, the adhesive layer covers at least 70% of the bottom surface. In some embodiments, the adhesive layer covers at least 75% of the bottom surface. In some embodiments, the adhesive layer covers at least 80% of the bottom surface. In some embodiments, the adhesive layer covers at least 85% of the bottom surface. In some embodiments, the adhesive layer covers at least 90% of the bottom surface. In some embodiments, the adhesive layer covers at least 95% of the bottom surface. In some embodiments, the adhesive layer covers at least 99% of the bottom surface.

In some embodiments, the adhesive layer covers 50% to 99% of the bottom surface. In some embodiments, the adhesive layer covers 50% to 95% of the bottom surface. In some embodiments, the adhesive layer covers 50% to 90% of the bottom surface. In some embodiments, the adhesive layer covers 50% to 85% of the bottom surface. In some embodiments, the adhesive layer covers 50% to 80% of the bottom surface. In some embodiments, the adhesive layer covers 50% to 75% of the bottom surface. In some embodiments, the adhesive layer covers 50% to 70% of the bottom surface. In some embodiments, the adhesive layer covers 50% to 65% of the bottom surface. In some embodiments, the adhesive layer covers 50% to 60% of the bottom surface. In some embodiments, the adhesive layer covers 50% to 55% of the bottom surface.

In some embodiments, the adhesive layer covers 55% to 99% of the bottom surface. In some embodiments, the adhesive layer covers 60% to 99% of the bottom surface. In some embodiments, the adhesive layer covers 65% to 99% of the bottom surface. In some embodiments, the adhesive layer covers 70% to 99% of the bottom surface. In some embodiments, the adhesive layer covers 75% to 99% of the bottom surface. In some embodiments, the adhesive layer covers 80% to 99% of the bottom surface. In some embodiments, the adhesive layer covers 85% to 99% of the bottom surface. In some embodiments, the adhesive layer covers 90% to 99% of the bottom surface. In some embodiments, the adhesive layer covers 95% to 99% of the bottom surface.

In some embodiments, the adhesive layer covers the bottom surface in its entirety.

In some embodiments, the adhesive layer is disposed on the top surface. In some embodiments, the adhesive layer is located on the top surface. In some embodiments, the adhesive layer is present on the top surface. In some embodiments, the adhesive layer is provided on the top surface. In some embodiments, the adhesive layer is adhered to the top surface. In some embodiments, the adhesive layer covers the top surface. In some embodiments, the adhesive layer directly contacts the top surface. In some embodiments, the adhesive layer is a coating on the top surface.

In some embodiments, the adhesive layer covers at least 50% of the top surface. In some embodiments, the adhesive layer covers at least 55% of the top surface. In some embodiments, the adhesive layer covers at least 60% of the top surface. In some embodiments, the adhesive layer covers at least 65% of the top surface. In some embodiments, the adhesive layer covers at least 70% of the top surface. In some embodiments, the adhesive layer covers at least 75% of the top surface. In some embodiments, the adhesive layer covers at least 80% of the top surface. In some embodiments, the adhesive layer covers at least 85% of the top surface. In some embodiments, the adhesive layer covers at least 90% of the top surface. In some embodiments, the adhesive layer covers at least 95% of the top surface. In some embodiments, the adhesive layer covers at least 99% of the top surface.

In some embodiments, the adhesive layer covers 50% to 99% of the top surface. In some embodiments, the adhesive layer covers 50% to 95% of the top surface. In some embodiments, the adhesive layer covers 50% to 90% of the top surface. In some embodiments, the adhesive layer covers 50% to 85% of the top surface. In some embodiments, the adhesive layer covers 50% to 80% of the top surface. In some embodiments, the adhesive layer covers 50% to 75% of the top surface. In some embodiments, the adhesive layer covers 50% to 70% of the top surface. In some embodiments, the adhesive layer covers 50% to 65% of the top surface. In some embodiments, the adhesive layer covers 50% to 60% of the top surface. In some embodiments, the adhesive layer covers 50% to 55% of the top surface.

In some embodiments, the adhesive layer covers 55% to 99% of the top surface. In some embodiments, the adhesive layer covers 60% to 99% of the top surface. In some embodiments, the adhesive layer covers 65% to 99% of the top surface. In some embodiments, the adhesive layer covers 70% to 99% of the top surface. In some embodiments, the adhesive layer covers 75% to 99% of the top surface. In some embodiments, the adhesive layer covers 80% to 99% of the top surface. In some embodiments, the adhesive layer covers 85% to 99% of the top surface. In some embodiments, the adhesive layer covers 90% to 99% of the top surface. In some embodiments, the adhesive layer covers 95% to 99% of the top surface.

In some embodiments, the adhesive layer covers the top surface in its entirety.

In some embodiments, the adhesive layer is disposed on the ribbed surface. In some embodiments, the adhesive layer is located on the ribbed surface. In some embodiments, the adhesive layer is present on the ribbed surface. In some embodiments, the adhesive layer is provided on the ribbed surface. In some embodiments, the adhesive layer is adhered to the ribbed surface. In some embodiments, the adhesive layer covers the ribbed surface. In some embodiments, the adhesive layer directly contacts the ribbed surface. In some embodiments, the adhesive layer is a coating on the ribbed surface. In some embodiments, the adhesive layer directly contacts the plurality of ribs.

In some embodiments, the adhesive layer covers at least 50% of the ribbed surface. In some embodiments, the adhesive layer covers at least 55% of the ribbed surface. In some embodiments, the adhesive layer covers at least 60% of the ribbed surface. In some embodiments, the adhesive layer covers at least 65% of the ribbed surface. In some embodiments, the adhesive layer covers at least 70% of the ribbed surface. In some embodiments, the adhesive layer covers at least 75% of the ribbed surface. In some embodiments, the adhesive layer covers at least 80% of the ribbed surface. In some embodiments, the adhesive layer covers at least 85% of the ribbed surface. In some embodiments, the adhesive layer covers at least 90% of the ribbed surface. In some embodiments, the adhesive layer covers at least 95% of the ribbed surface. In some embodiments, the adhesive layer covers at least 99% of the ribbed surface.

In some embodiments, the adhesive layer covers 50% to 99% of the ribbed surface. In some embodiments, the adhesive layer covers 50% to 95% of the ribbed surface. In some embodiments, the adhesive layer covers 50% to 90% of the ribbed surface. In some embodiments, the adhesive layer covers 50% to 85% of the ribbed surface. In some embodiments, the adhesive layer covers 50% to 80% of the ribbed surface. In some embodiments, the adhesive layer covers 50% to 75% of the ribbed surface. In some embodiments, the adhesive layer covers 50% to 70% of the ribbed surface. In some embodiments, the adhesive layer covers 50% to 65% of the ribbed surface. In some embodiments, the adhesive layer covers 50% to 60% of the ribbed surface. In some embodiments, the adhesive layer covers 50% to 55% of the ribbed surface.

In some embodiments, the adhesive layer covers 55% to 99% of the ribbed surface. In some embodiments, the adhesive layer covers 60% to 99% of the ribbed surface. In some embodiments, the adhesive layer covers 65% to 99% of the ribbed surface. In some embodiments, the adhesive layer covers 70% to 99% of the ribbed surface. In some embodiments, the adhesive layer covers 75% to 99% of the ribbed surface. In some embodiments, the adhesive layer covers 80% to 99% of the ribbed surface. In some embodiments, the adhesive layer covers 85% to 99% of the ribbed surface. In some embodiments, the adhesive layer covers 90% to 99% of the ribbed surface. In some embodiments, the adhesive layer covers 95% to 99% of the ribbed surface.

In some embodiments, the adhesive layer covers the ribbed surface in its entirety.

In some embodiments, the adhesive layer has a thickness that is less than the rib height of the plurality of ribs. In some embodiments, the thickness of the adhesive layer is 1 mil to 100 mils. In some embodiments, the thickness of the adhesive layer is 1 mil to 90 mils. In some embodiments, the thickness of the adhesive layer is 1 mil to 80 mils. In some embodiments, the thickness of the adhesive layer is 1 mil to 70 mils. In some embodiments, the thickness of the adhesive layer is 1 mil to 60 mils. In some embodiments, the thickness of the adhesive layer is 1 mil to 50 mils. In some embodiments, the thickness of the adhesive layer is 1 mil to 40 mils. In some embodiments, the thickness of the adhesive layer is 1 mil to 30 mils. In some embodiments, the thickness of the adhesive layer is 1 mil to 20 mils. In some embodiments, the thickness of the adhesive layer is 1 mil to 10 mils. In some embodiments, the thickness of the adhesive layer is 1 mil to 9 mils. In some embodiments, the thickness of the adhesive layer is 1 mil to 8 mils. In some embodiments, the thickness of the adhesive layer is 1 mil to 7 mils. In some embodiments, the thickness of the adhesive layer is 1 mil to 6 mils. In some embodiments, the thickness of the adhesive layer is 1 mil to 5 mils. In some embodiments, the thickness of the adhesive layer is 1 mil to 4 mils. In some embodiments, the thickness of the adhesive layer is 1 mil to 3 mils. In some embodiments, the thickness of the adhesive layer is 1 mil to 2 mils.

In some embodiments, the thickness of the adhesive layer is 10 mils to 100 mils. In some embodiments, the thickness of the adhesive layer is 20 mils to 100 mils. In some embodiments, the thickness of the adhesive layer is 30 mils to 100 mils. In some embodiments, the thickness of the adhesive layer is 40 mils to 100 mils. In some embodiments, the thickness of the adhesive layer is 50 mils to 100 mils. In some embodiments, the thickness of the adhesive layer is 60 mils to 100 mils. In some embodiments, the thickness of the adhesive layer is 70 mils to 100 mils. In some embodiments, the thickness of the adhesive layer is 80 mils to 100 mils. In some embodiments, the thickness of the adhesive layer is 90 mils to 100 mils.

In some embodiments, a portion of the plurality of ribs is exposed through the adhesive layer. In some embodiments, 1% to 99% of the plurality of ribs is exposed through the adhesive layer. In some embodiments, 1% to 95% of the plurality of ribs is exposed through the adhesive layer. In some embodiments, 1% to 90% of the plurality of ribs is exposed through the adhesive layer. In some embodiments, 1% to 85% of the plurality of ribs is exposed through the adhesive layer. In some embodiments, 1% to 80% of the plurality of ribs is exposed through the adhesive layer. In some embodiments, 1% to 75% of the plurality of ribs is exposed through the adhesive layer. In some embodiments, 1% to 70% of the plurality of ribs is exposed through the adhesive layer. In some embodiments, 1% to 65% of the plurality of ribs is exposed through the adhesive layer. In some embodiments, 1% to 60% of the plurality of ribs is exposed through the adhesive layer. In some embodiments, 1% to 55% of the plurality of ribs is exposed through the adhesive layer. In some embodiments, 1% to 50% of the plurality of ribs is exposed through the adhesive layer. In some embodiments, 1% to 45% of the plurality of ribs is exposed through the adhesive layer. In some embodiments, 1% to 40% of the plurality of ribs is exposed through the adhesive layer. In some embodiments, 1% to 35% of the plurality of ribs is exposed through the adhesive layer. In some embodiments, 1% to 30% of the plurality of ribs is exposed through the adhesive layer. In some embodiments, 1% to 25% of the plurality of ribs is exposed through the adhesive layer. In some embodiments, 1% to 20% of the plurality of ribs is exposed through the adhesive layer. In some embodiments, 1% to 15% of the plurality of ribs is exposed through the adhesive layer. In some embodiments, 1% to 10% of the plurality of ribs is exposed through the adhesive layer. In some embodiments, 1% to 5% of the plurality of ribs is exposed through the adhesive layer.

In some embodiments, 5% to 99% of the plurality of ribs is exposed through the adhesive layer. In some embodiments, 10% to 99% of the plurality of ribs is exposed through the adhesive layer. In some embodiments, 15% to 99% of the plurality of ribs is exposed through the adhesive layer. In some embodiments, 20% to 99% of the plurality of ribs is exposed through the adhesive layer. In some embodiments, 25% to 99% of the plurality of ribs is exposed through the adhesive layer. In some embodiments, 30% to 99% of the plurality of ribs is exposed through the adhesive layer. In some embodiments, 35% to 99% of the plurality of ribs is exposed through the adhesive layer. In some embodiments, 40% to 99% of the plurality of ribs is exposed through the adhesive layer. In some embodiments, 45% to 99% of the plurality of ribs is exposed through the adhesive layer. In some embodiments, 50% to 99% of the plurality of ribs is exposed through the adhesive layer. In some embodiments, 55% to 99% of the plurality of ribs is exposed through the adhesive layer. In some embodiments, 60% to 99% of the plurality of ribs is exposed through the adhesive layer. In some embodiments, 65% to 99% of the plurality of ribs is exposed through the adhesive layer. In some embodiments, 70% to 99% of the plurality of ribs is exposed through the adhesive layer. In some embodiments, 75% to 99% of the plurality of ribs is exposed through the adhesive layer. In some embodiments, 80% to 99% of the plurality of ribs is exposed through the adhesive layer. In some embodiments, 85% to 99% of the plurality of ribs is exposed through the adhesive layer. In some embodiments, 90% to 99% of the plurality of ribs is exposed through the adhesive layer. In some embodiments, 95% to 99% of the plurality of ribs is exposed through the adhesive layer.

In some embodiments, the water vapor permeable ribbed membrane comprises 50 grams per square meter (GSM) to 700 GSM of adhesive. In some embodiments, the water vapor permeable ribbed membrane comprises 50 GSM to 680 GSM of adhesive. In some embodiments, the water vapor permeable ribbed membrane comprises 50 GSM to 660 GSM of adhesive. In some embodiments, the water vapor permeable ribbed membrane comprises 50 GSM to 640 GSM of adhesive. In some embodiments, the water vapor permeable ribbed membrane comprises 50 GSM to 620 GSM of adhesive. In some embodiments, the water vapor permeable ribbed membrane comprises 50 grams per square meter (GSM) to 600 GSM of adhesive. In some embodiments, the water vapor permeable ribbed membrane comprises 50 GSM to 580 GSM of adhesive. In some embodiments, the water vapor permeable ribbed membrane comprises 50 GSM to 560 GSM of adhesive. In some embodiments, the water vapor permeable ribbed membrane comprises 50 GSM to 540 GSM of adhesive. In some embodiments, the water vapor permeable ribbed membrane comprises 50 GSM to 520 GSM of adhesive. In some embodiments, the water vapor permeable ribbed membrane comprises 50 grams per square meter (GSM) to 500 GSM of adhesive. In some embodiments, the water vapor permeable ribbed membrane comprises 50 GSM to 480 GSM of adhesive. In some embodiments, the water vapor permeable ribbed membrane comprises 50 GSM to 460 GSM of adhesive. In some embodiments, the water vapor permeable ribbed membrane comprises 50 GSM to 440 GSM of adhesive. In some embodiments, the water vapor permeable ribbed membrane comprises 50 GSM to 420 GSM of adhesive. In some embodiments, the water vapor permeable ribbed membrane comprises 50 GSM to 400 GSM of adhesive. In some embodiments, the water vapor permeable ribbed membrane comprises 50 GSM to 380 GSM of adhesive. In some embodiments, the water vapor permeable ribbed membrane comprises 50 GSM to 360 GSM of adhesive. In some embodiments, the water vapor permeable ribbed membrane comprises 50 GSM to 340 GSM of adhesive. In some embodiments, the water vapor permeable ribbed membrane comprises 50 GSM to 320 GSM of adhesive. In some embodiments, the water vapor permeable ribbed membrane comprises 50 GSM to 300 GSM of adhesive. In some embodiments, the water vapor permeable ribbed membrane comprises 50 GSM to 280 GSM of adhesive. In some embodiments, the water vapor permeable ribbed membrane comprises 50 GSM to 260 GSM of adhesive. In some embodiments, the water vapor permeable ribbed membrane comprises 50 GSM to 240 GSM of adhesive. In some embodiments, the water vapor permeable ribbed membrane comprises 50 GSM to 220 GSM of adhesive. In some embodiments, the water vapor permeable ribbed membrane comprises 50 GSM to 200 GSM of adhesive. In some embodiments, the water vapor permeable ribbed membrane comprises 50 GSM to 180 GSM of adhesive. In some embodiments, the water vapor permeable ribbed membrane comprises 50 GSM to 160 GSM of adhesive. In some embodiments, the water vapor permeable ribbed membrane comprises 50 GSM to 140 GSM of adhesive. In some embodiments, the water vapor permeable ribbed membrane comprises 50 GSM to 120 GSM of adhesive. In some embodiments, the water vapor permeable ribbed membrane comprises 50 GSM to 100 GSM of adhesive. In some embodiments, the water vapor permeable ribbed membrane comprises 50 GSM to 80 GSM of adhesive. In some embodiments, the water vapor permeable ribbed membrane comprises 50 GSM to 60 GSM of adhesive.

In some embodiments, the water vapor permeable ribbed membrane comprises 50 GSM to 500 GSM of adhesive. In some embodiments, the water vapor permeable ribbed membrane comprises 60 GSM to 500 GSM of adhesive. In some embodiments, the water vapor permeable ribbed membrane comprises 80 GSM to 500 GSM of adhesive. In some embodiments, the water vapor permeable ribbed membrane comprises 100 GSM to 500 GSM of adhesive. In some embodiments, the water vapor permeable ribbed membrane comprises 120 GSM to 500 GSM of adhesive. In some embodiments, the water vapor permeable ribbed membrane comprises 140 GSM to 500 GSM of adhesive. In some embodiments, the water vapor permeable ribbed membrane comprises 160 GSM to 500 GSM of adhesive. In some embodiments, the water vapor permeable ribbed membrane comprises 180 GSM to 500 GSM of adhesive. In some embodiments, the water vapor permeable ribbed membrane comprises 200 GSM to 500 GSM of adhesive. In some embodiments, the water vapor permeable ribbed membrane comprises 220 GSM to 500 GSM of adhesive. In some embodiments, the water vapor permeable ribbed membrane comprises 240 GSM to 500 GSM of adhesive. In some embodiments, the water vapor permeable ribbed membrane comprises 260 GSM to 500 GSM of adhesive. In some embodiments, the water vapor permeable ribbed membrane comprises 280 GSM to 500 GSM of adhesive. In some embodiments, the water vapor permeable ribbed membrane comprises 300 GSM to 500 GSM of adhesive. In some embodiments, the water vapor permeable ribbed membrane comprises 320 GSM to 500 GSM of adhesive. In some embodiments, the water vapor permeable ribbed membrane comprises 340 GSM to 500 GSM of adhesive. In some embodiments, the water vapor permeable ribbed membrane comprises 360 GSM to 500 GSM of adhesive. In some embodiments, the water vapor permeable ribbed membrane comprises 380 GSM to 500 GSM of adhesive. In some embodiments, the water vapor permeable ribbed membrane comprises 400 GSM to 500 GSM of adhesive. In some embodiments, the water vapor permeable ribbed membrane comprises 420 GSM to 500 GSM of adhesive. In some embodiments, the water vapor permeable ribbed membrane comprises 440 GSM to 500 GSM of adhesive. In some embodiments, the water vapor permeable ribbed membrane comprises 460 GSM to 500 GSM of adhesive. In some embodiments, the water vapor permeable ribbed membrane comprises 480 GSM to 500 GSM of adhesive. In some embodiments, the water vapor permeable ribbed membrane comprises 200 GSM to 600 GSM of adhesive.

In some embodiments, the adhesive layer is not water vapor permeable. In some embodiments, for example, the adhesive layer has a water vapor permeability of 10 perms or less, as measured according to ASTM E96B. In some embodiments, the adhesive layer has a water vapor permeability of 9 perms or less, as measured according to ASTM E96B. In some embodiments, the adhesive layer has a water vapor permeability of 8 perms or less, as measured according to ASTM E96B. In some embodiments, the adhesive layer has a water vapor permeability of 7 perms or less, as measured according to ASTM E96B. In some embodiments, the adhesive layer has a water vapor permeability of 6 perms or less, as measured according to ASTM E96B. In some embodiments, the adhesive layer has a water vapor permeability of 5 perms or less, as measured according to ASTM E96B. In some embodiments, the adhesive layer has a water vapor permeability of 4 perms or less, as measured according to ASTM E96B. In some embodiments, the adhesive layer has a water vapor permeability of 3 perms or less, as measured according to ASTM E96B. In some embodiments, the adhesive layer has a water vapor permeability of 2 perms or less, as measured according to ASTM E96B. In some embodiments, the adhesive layer has a water vapor permeability of 1 perms or less, as measured according to ASTM E96B. In some embodiments, the adhesive layer has a water vapor permeability of 0.1 perms or less, as measured according to ASTM E96B. In some embodiments, the adhesive layer has a water vapor permeability of 0.01 perms or less, as measured according to ASTM E96B.

In some embodiments, the adhesive layer has a water vapor permeability of greater than 1 perm to 10 perms, as measured according to ASTM E96B. In some embodiments, the adhesive layer has a water vapor permeability of greater than 1 perm to 9 perms, as measured according to ASTM E96B. In some embodiments, the adhesive layer has a water vapor permeability of greater than 1 perm to 8 perms, as measured according to ASTM E96B. In some embodiments, the adhesive layer has a water vapor permeability of greater than 1 perm to 7 perms, as measured according to ASTM E96B. In some embodiments, the adhesive layer has a water vapor permeability of greater than 1 perm to 6 perms, as measured according to ASTM E96B. In some embodiments, the adhesive layer has a water vapor permeability of greater than 1 perm to 5 perms, as measured according to ASTM E96B. In some embodiments, the adhesive layer has a water vapor permeability of greater than 1 perm to 4 perms, as measured according to ASTM E96B. In some embodiments, the adhesive layer has a water vapor permeability of greater than 1 perm to 3 perms, as measured according to ASTM E96B. In some embodiments, the adhesive layer has a water vapor permeability of greater than 1 perm to 2 perms, as measured according to ASTM E96B.

In some embodiments, the adhesive layer has a water vapor permeability of 2 perms to 10 perms, as measured according to ASTM E96B. In some embodiments, the adhesive layer has a water vapor permeability of 3 perms to 10 perms, as measured according to ASTM E96B. In some embodiments, the adhesive layer has a water vapor permeability of 4 perms to 10 perms, as measured according to ASTM E96B. In some embodiments, the adhesive layer has a water vapor permeability of 5 perms to 10 perms, as measured according to ASTM E96B. In some embodiments, the adhesive layer has a water vapor permeability of 6 perms to 10 perms, as measured according to ASTM E96B. In some embodiments, the adhesive layer has a water vapor permeability of 7 perms to 10 perms, as measured according to ASTM E96B. In some embodiments, the adhesive layer has a water vapor permeability of 8 perms to 10 perms, as measured according to ASTM E96B. In some embodiments, the adhesive layer has a water vapor permeability of 9 perms to 10 perms, as measured according to ASTM E96B.

In some embodiments, the adhesive layer has a water vapor permeability of greater than 0.1 perms to 1 perm, as measured according to ASTM E96B. In some embodiments, the adhesive layer has a water vapor permeability of greater than 0.1 perms to 0.9 perm, as measured according to ASTM E96B. In some embodiments, the adhesive layer has a water vapor permeability of greater than 0.1 perms to 0.8 perm, as measured according to ASTM E96B. In some embodiments, the adhesive layer has a water vapor permeability of greater than 0.1 perms to 0.7 perm, as measured according to ASTM E96B. In some embodiments, the adhesive layer has a water vapor permeability of greater than 0.1 perms to 0.6 perm, as measured according to ASTM E96B. In some embodiments, the adhesive layer has a water vapor permeability of greater than 0.1 perms to 0.5 perm, as measured according to ASTM E96B. In some embodiments, the adhesive layer has a water vapor permeability of greater than 0.1 perms to 0.4 perm, as measured according to ASTM E96B. In some embodiments, the adhesive layer has a water vapor permeability of greater than 0.1 perms to 0.3 perm, as measured according to ASTM E96B. In some embodiments, the adhesive layer has a water vapor permeability of greater than 0.1 perms to 0.2 perm, as measured according to ASTM E96B.

In some embodiments, the adhesive layer has a water vapor permeability of greater than 0.2 perms to 1 perm, as measured according to ASTM E96B. In some embodiments, the adhesive layer has a water vapor permeability of greater than 0.3 perms to 1 perm, as measured according to ASTM E96B. In some embodiments, the adhesive layer has a water vapor permeability of greater than 0.4 perms to 1 perm, as measured according to ASTM E96B. In some embodiments, the adhesive layer has a water vapor permeability of greater than 0.5 perms to 1 perm, as measured according to ASTM E96B. In some embodiments, the adhesive layer has a water vapor permeability of greater than 0.6 perms to 1 perm, as measured according to ASTM E96B. In some embodiments, the adhesive layer has a water vapor permeability of greater than 0.7 perms to 1 perm, as measured according to ASTM E96B. In some embodiments, the adhesive layer has a water vapor permeability of greater than 0.8 perms to 1 perm, as measured according to ASTM E96B. In some embodiments, the adhesive layer has a water vapor permeability of greater than 0.9 perms to 1 perm, as measured according to ASTM E96B.

In some embodiments, the adhesive layer has a water vapor permeability of 0.1 perms or less, as measured according to ASTM E96B.

In some embodiments, the water vapor permeable ribbed membrane is water vapor permeable even though the adhesive layer is not water vapor permeable. In some embodiments, for example, the water vapor permeable ribbed membrane has a water vapor permeability of greater than 10 perms, as measured according to ASTM E96B. In some embodiments, the water vapor permeable ribbed membrane has a water vapor permeability of greater than 15 perms, as measured according to ASTM E96B. In some embodiments, the water vapor permeable ribbed membrane has a water vapor permeability of greater than 20 perms, as measured according to ASTM E96B. In some embodiments, the water vapor permeable ribbed membrane has a water vapor permeability of greater than 25 perms, as measured according to ASTM E96B. In some embodiments, the water vapor permeable ribbed membrane has a water vapor permeability of greater than 30 perms, as measured according to ASTM E96B. In some embodiments, the water vapor permeable ribbed membrane has a water vapor permeability of greater than 35 perms, as measured according to ASTM E96B. In some embodiments, the water vapor permeable ribbed membrane has a water vapor permeability of greater than 40 perms, as measured according to ASTM E96B. In some embodiments, the water vapor permeable ribbed membrane has a water vapor permeability of greater than 45 perms, as measured according to ASTM E96B. In some embodiments, the water vapor permeable ribbed membrane has a water vapor permeability of greater than 50 perms, as measured according to ASTM E96B.

In some embodiments, the water vapor permeable ribbed membrane has a water vapor permeability of greater than 55 perms, as measured according to ASTM E96B. In some embodiments, the water vapor permeable ribbed membrane has a water vapor permeability of greater than 60 perms, as measured according to ASTM E96B. In some embodiments, the water vapor permeable ribbed membrane has a water vapor permeability of greater than 65 perms, as measured according to ASTM E96B. In some embodiments, the water vapor permeable ribbed membrane has a water vapor permeability of greater than 70 perms, as measured according to ASTM E96B. In some embodiments, the water vapor permeable ribbed membrane has a water vapor permeability of greater than 75 perms, as measured according to ASTM E96B. In some embodiments, the water vapor permeable ribbed membrane has a water vapor permeability of greater than 80 perms, as measured according to ASTM E96B. In some embodiments, the water vapor permeable ribbed membrane has a water vapor permeability of greater than 85 perms, as measured according to ASTM E96B. In some embodiments, the water vapor permeable ribbed membrane has a water vapor permeability of greater than 90 perms, as measured according to ASTM E96B. In some embodiments, the water vapor permeable ribbed membrane has a water vapor permeability of greater than 95 perms, as measured according to ASTM E96B.

In some embodiments, the water vapor permeable ribbed membrane has a water vapor permeability of greater than 10 perms to 120 perms, as measured according to ASTM E96B. In some embodiments, the water vapor permeable ribbed membrane has a water vapor permeability of 15 perms to 120 perms, as measured according to ASTM E96B. In some embodiments, the water vapor permeable ribbed membrane has a water vapor permeability of 20 perms to 120 perms, as measured according to ASTM E96B. In some embodiments, the water vapor permeable ribbed membrane has a water vapor permeability of 25 perms to 120 perms, as measured according to ASTM E96B. In some embodiments, the water vapor permeable ribbed membrane has a water vapor permeability of 30 perms to 120 perms, as measured according to ASTM E96B. In some embodiments, the water vapor permeable ribbed membrane has a water vapor permeability of 35 perms to 120 perms, as measured according to ASTM E96B. In some embodiments, the water vapor permeable ribbed membrane has a water vapor permeability of 40 perms to 120 perms, as measured according to ASTM E96B. In some embodiments, the water vapor permeable ribbed membrane has a water vapor permeability of 45 perms to 120 perms, as measured according to ASTM E96B. In some embodiments, the water vapor permeable ribbed membrane has a water vapor permeability of 50 perms to 120 perms, as measured according to ASTM E96B.

In some embodiments, the water vapor permeable ribbed membrane has a water vapor permeability of 55 perms to 120 perms, as measured according to ASTM E96B. In some embodiments, the water vapor permeable ribbed membrane has a water vapor permeability of 60 perms to 120 perms, as measured according to ASTM E96B. In some embodiments, the water vapor permeable ribbed membrane has a water vapor permeability of 65 perms to 120 perms, as measured according to ASTM E96B. In some embodiments, the water vapor permeable ribbed membrane has a water vapor permeability of 70 perms to 120 perms, as measured according to ASTM E96B. In some embodiments, the water vapor permeable ribbed membrane has a water vapor permeability of 75 perms to 120 perms, as measured according to ASTM E96B. In some embodiments, the water vapor permeable ribbed membrane has a water vapor permeability of 80 perms to 120 perms, as measured according to ASTM E96B. In some embodiments, the water vapor permeable ribbed membrane has a water vapor permeability of 85 perms to 120 perms, as measured according to ASTM E96B. In some embodiments, the water vapor permeable ribbed membrane has a water vapor permeability of 90 perms to 120 perms, as measured according to ASTM E96B. In some embodiments, the water vapor permeable ribbed membrane has a water vapor permeability of 95 perms to 120 perms, as measured according to ASTM E96B. In some embodiments, the water vapor permeable ribbed membrane has a water vapor permeability of 100 perms to 120 perms, as measured according to ASTM E96B. In some embodiments, the water vapor permeable ribbed membrane has a water vapor permeability of 105 perms to 120 perms, as measured according to ASTM E96B. In some embodiments, the water vapor permeable ribbed membrane has a water vapor permeability of 110 perms to 120 perms, as measured according to ASTM E96B. In some embodiments, the water vapor permeable ribbed membrane has a water vapor permeability of 115 perms to 120 perms, as measured according to ASTM E96B.

In some embodiments, the water vapor permeable ribbed membrane has a water vapor permeability of greater than 10 perms to 115 perms, as measured according to ASTM E96B. In some embodiments, the water vapor permeable ribbed membrane has a water vapor permeability of greater than 10 perms to 110 perms, as measured according to ASTM E96B. In some embodiments, the water vapor permeable ribbed membrane has a water vapor permeability of greater than 10 perms to 105 perms, as measured according to ASTM E96B. In some embodiments, the water vapor permeable ribbed membrane has a water vapor permeability of greater than 10 perms to 100 perms, as measured according to ASTM E96B. In some embodiments, the water vapor permeable ribbed membrane has a water vapor permeability of greater than 10 perms to 95 perms, as measured according to ASTM E96B. In some embodiments, the water vapor permeable ribbed membrane has a water vapor permeability of greater than 10 perms to 90 perms, as measured according to ASTM E96B. In some embodiments, the water vapor permeable ribbed membrane has a water vapor permeability of greater than 10 perms to 85 perms, as measured according to ASTM E96B. In some embodiments, the water vapor permeable ribbed membrane has a water vapor permeability of greater than 10 perms to 80 perms, as measured according to ASTM E96B. In some embodiments, the water vapor permeable ribbed membrane has a water vapor permeability of greater than 10 perms to 75 perms, as measured according to ASTM E96B. In some embodiments, the water vapor permeable ribbed membrane has a water vapor permeability of greater than 10 perms to 70 perms, as measured according to ASTM E96B. In some embodiments, the water vapor permeable ribbed membrane has a water vapor permeability of greater than 10 perms to 65 perms, as measured according to ASTM E96B. In some embodiments, the water vapor permeable ribbed membrane has a water vapor permeability of greater than 10 perms to 60 perms, as measured according to ASTM E96B. In some embodiments, the water vapor permeable ribbed membrane has a water vapor permeability of greater than 10 perms to 55 perms, as measured according to ASTM E96B.

In some embodiments, the water vapor permeable ribbed membrane has a water vapor permeability of greater than 10 perms to 50 perms, as measured according to ASTM E96B. In some embodiments, the water vapor permeable ribbed membrane has a water vapor permeability of greater than 10 perms to 45 perms, as measured according to ASTM E96B. In some embodiments, the water vapor permeable ribbed membrane has a water vapor permeability of greater than 10 perms to 40 perms, as measured according to ASTM E96B. In some embodiments, the water vapor permeable ribbed membrane has a water vapor permeability of greater than 10 perms to 35 perms, as measured according to ASTM E96B. In some embodiments, the water vapor permeable ribbed membrane has a water vapor permeability of greater than 10 perms to 30 perms, as measured according to ASTM E96B. In some embodiments, the water vapor permeable ribbed membrane has a water vapor permeability of greater than 10 perms to 25 perms, as measured according to ASTM E96B. In some embodiments, the water vapor permeable ribbed membrane has a water vapor permeability of greater than 10 perms to 20 perms, as measured according to ASTM E96B. In some embodiments, the water vapor permeable ribbed membrane has a water vapor permeability of greater than 10 perms to 15 perms, as measured according to ASTM E96B.

In some embodiments, the water vapor permeable ribbed membrane has a water vapor permeability of greater than 10 perms to 100 perms, as measured according to ASTM E96A. In some embodiments, the water vapor permeable ribbed membrane has a water vapor permeability of greater than 10 perms to 95 perms, as measured according to ASTM E96A. In some embodiments, the water vapor permeable ribbed membrane has a water vapor permeability of greater than 10 perms to 90 perms, as measured according to ASTM E96A. In some embodiments, the water vapor permeable ribbed membrane has a water vapor permeability of greater than 10 perms to 85 perms, as measured according to ASTM E96A. In some embodiments, the water vapor permeable ribbed membrane has a water vapor permeability of greater than 10 perms to 80 perms, as measured according to ASTM E96A. In some embodiments, the water vapor permeable ribbed membrane has a water vapor permeability of greater than 10 perms to 75 perms, as measured according to ASTM E96A. In some embodiments, the water vapor permeable ribbed membrane has a water vapor permeability of greater than 10 perms to 70 perms, as measured according to ASTM E96A. In some embodiments, the water vapor permeable ribbed membrane has a water vapor permeability of greater than 10 perms to 65 perms, as measured according to ASTM E96A. In some embodiments, the water vapor permeable ribbed membrane has a water vapor permeability of greater than 10 perms to 60 perms, as measured according to ASTM E96A. In some embodiments, the water vapor permeable ribbed membrane has a water vapor permeability of greater than 10 perms to 55 perms, as measured according to ASTM E96A. In some embodiments, the water vapor permeable ribbed membrane has a water vapor permeability of greater than 10 perms to 50 perms, as measured according to ASTM E96A. In some embodiments, the water vapor permeable ribbed membrane has a water vapor permeability of greater than 10 perms to 45 perms, as measured according to ASTM E96A. In some embodiments, the water vapor permeable ribbed membrane has a water vapor permeability of greater than 10 perms to 40 perms, as measured according to ASTM E96A. In some embodiments, the water vapor permeable ribbed membrane has a water vapor permeability of greater than 10 perms to 35 perms, as measured according to ASTM E96A. In some embodiments, the water vapor permeable ribbed membrane has a water vapor permeability of greater than 10 perms to 30 perms, as measured according to ASTM E96A. In some embodiments, the water vapor permeable ribbed membrane has a water vapor permeability of greater than 10 perms to 25 perms, as measured according to ASTM E96A. In some embodiments, the water vapor permeable ribbed membrane has a water vapor permeability of greater than 10 perms to 20 perms, as measured according to ASTM E96A. In some embodiments, the water vapor permeable ribbed membrane has a water vapor permeability of greater than 10 perms to 15 perms, as measured according to ASTM E96A. In some embodiments, the water vapor permeable ribbed membrane has a water vapor permeability of greater than 15 perms to 100 perms, as measured according to ASTM E96A. In some embodiments, the water vapor permeable ribbed membrane has a water vapor permeability of greater than 20 perms to 100 perms, as measured according to ASTM E96A. In some embodiments, the water vapor permeable ribbed membrane has a water vapor permeability of greater than 25 perms to 100 perms, as measured according to ASTM E96A. In some embodiments, the water vapor permeable ribbed membrane has a water vapor permeability of greater than 30 perms to 100 perms, as measured according to ASTM E96A. In some embodiments, the water vapor permeable ribbed membrane has a water vapor permeability of greater than 35 perms to 100 perms, as measured according to ASTM E96A. In some embodiments, the water vapor permeable ribbed membrane has a water vapor permeability of greater than 40 perms to 100 perms, as measured according to ASTM E96A. In some embodiments, the water vapor permeable ribbed membrane has a water vapor permeability of greater than 45 perms to 100 perms, as measured according to ASTM E96A. In some embodiments, the water vapor permeable ribbed membrane has a water vapor permeability of greater than 50 perms to 100 perms, as measured according to ASTM E96A. In some embodiments, the water vapor permeable ribbed membrane has a water vapor permeability of greater than 55 perms to 100 perms, as measured according to ASTM E96A. In some embodiments, the water vapor permeable ribbed membrane has a water vapor permeability of greater than 60 perms to 100 perms, as measured according to ASTM E96A. In some embodiments, the water vapor permeable ribbed membrane has a water vapor permeability of greater than 65 perms to 100 perms, as measured according to ASTM E96A. In some embodiments, the water vapor permeable ribbed membrane has a water vapor permeability of greater than 70 perms to 100 perms, as measured according to ASTM E96A. In some embodiments, the water vapor permeable ribbed membrane has a water vapor permeability of greater than 75 perms to 100 perms, as measured according to ASTM E96A. In some embodiments, the water vapor permeable ribbed membrane has a water vapor permeability of greater than 80 perms to 100 perms, as measured according to ASTM E96A. In some embodiments, the water vapor permeable ribbed membrane has a water vapor permeability of greater than 85 perms to 100 perms, as measured according to ASTM E96A. In some embodiments, the water vapor permeable ribbed membrane has a water vapor permeability of greater than 90 perms to 100 perms, as measured according to ASTM E96A. In some embodiments, the water vapor permeable ribbed membrane has a water vapor permeability of greater than 95 perms to 100 perms, as measured according to ASTM E96A.

In some embodiments, when ranges for the water vapor permeability of the water vapor permeable ribbed membrane are provided (e.g., when measured according to ASTM E96A and/or when measured according to ASTM E96B), the range corresponds to the range of water vapor permeabilities observed for a water vapor permeable ribbed membrane having any one or more of the thicknesses (or other dimensions) disclosed herein, including, for example and without limitation, at least one of a rib height, a membrane thickness, adhesive layer thickness, coat weight (GSM), or any combination thereof, etc. For simplicity, these ranges and the other ranges disclosed herein are not repeated here.

In some embodiments, when the adhesive layer of the water vapor permeable ribbed membrane is adhered to a top surface of another water vapor permeable ribbed membrane, the adhesive layer has a peel adhesion of at least 1.5 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 2 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 3 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 4 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 5 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 6 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 7 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 8 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 9 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 10 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 11 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 12 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 13 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 14 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 15 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 16 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 17 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 18 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 19 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of at least 20 lb/in, as measured according to ASTM D3330 (Method B).

In some embodiments, when the adhesive layer of the water vapor permeable ribbed membrane is adhered to a top surface of another water vapor permeable ribbed membrane, the adhesive layer has a peel adhesion of 1.5 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 24 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 22 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 20 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 18 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 16 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 15 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 14 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 12 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 10 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 8 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 6 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 5 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 4 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 1.5 lb/in to 2 lb/in, as measured according to ASTM D3330 (Method B).

In some embodiments, when the adhesive layer of the water vapor permeable ribbed membrane is adhered to a top surface of another water vapor permeable ribbed membrane, the adhesive layer has a peel adhesion of 2 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 4 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 5 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 6 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 8 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 10 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 12 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 14 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 15 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 16 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 18 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 20 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 22 lb/in to 25 lb/in, as measured according to ASTM D3330 (Method B). In some embodiments, when the adhesive layer of the water vapor permeable ribbed membrane is adhered to a top surface of another water vapor permeable ribbed membrane, the adhesive layer has a peel adhesion of 24 lb/in to 25 lb/in, as measured according to ASTM D3330 (Method B).

In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 28 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 26 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 25 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 24 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 22 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 20 lb/in, as measured according to ASTM D3330 (Method F).

In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 18 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 16 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 15 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 14 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 12 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 10 lb/in, as measured according to ASTM D3330 (Method F).

In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 8 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 6 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 5 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 4 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 1 lb/in to 2 lb/in, as measured according to ASTM D3330 (Method F).

In some embodiments, when the adhesive layer of the water vapor permeable ribbed membrane is adhered to a substrate, the adhesive layer exhibits a peel adhesion between the water vapor permeable ribbed membrane and the substrate of 2 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 4 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 5 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 6 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 8 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 10 lb/in to 30 lb/in, as measured according to ASTM D3330 (Method F).

In some embodiments, when the adhesive layer of the water vapor permeable ribbed membrane is adhered to a substrate, the adhesive layer exhibits a peel adhesion between the water vapor permeable ribbed membrane and the substrate of 12 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 14 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 15 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 16 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 18 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 20 lb/in to 30 lb/in, as measured according to ASTM D3330 (Method F).

In some embodiments, when the adhesive layer of the water vapor permeable ribbed membrane is adhered to a substrate, the adhesive layer exhibits a peel adhesion between the water vapor permeable ribbed membrane and the substrate of 22 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 24 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 25 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 26 lb/in to 30 lb/in, as measured according to ASTM D3330 (Method F). In some embodiments, when the adhesive layer of the water vapor permeable ribbed membrane is adhered to a substrate, the adhesive layer exhibits a peel adhesion between the water vapor permeable ribbed membrane and the substrate of 28 lb/in to 30 lb/in, as measured according to ASTM D3330 (Method A).

Figure 2:
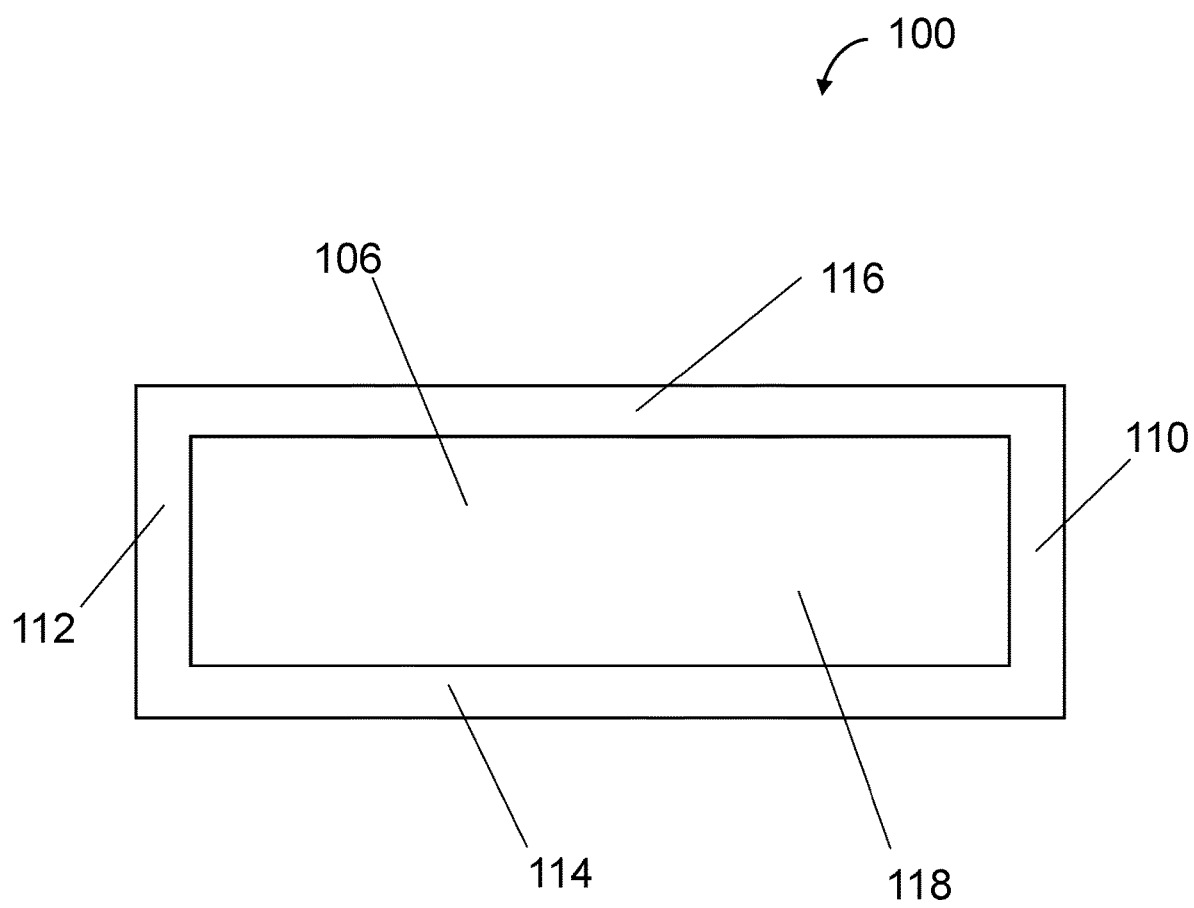
FIG. 2 illustrates a bottom view of the embodiment of the water vapor permeable ribbed membrane of FIG. 1, according to some embodiments.
Figure 3:
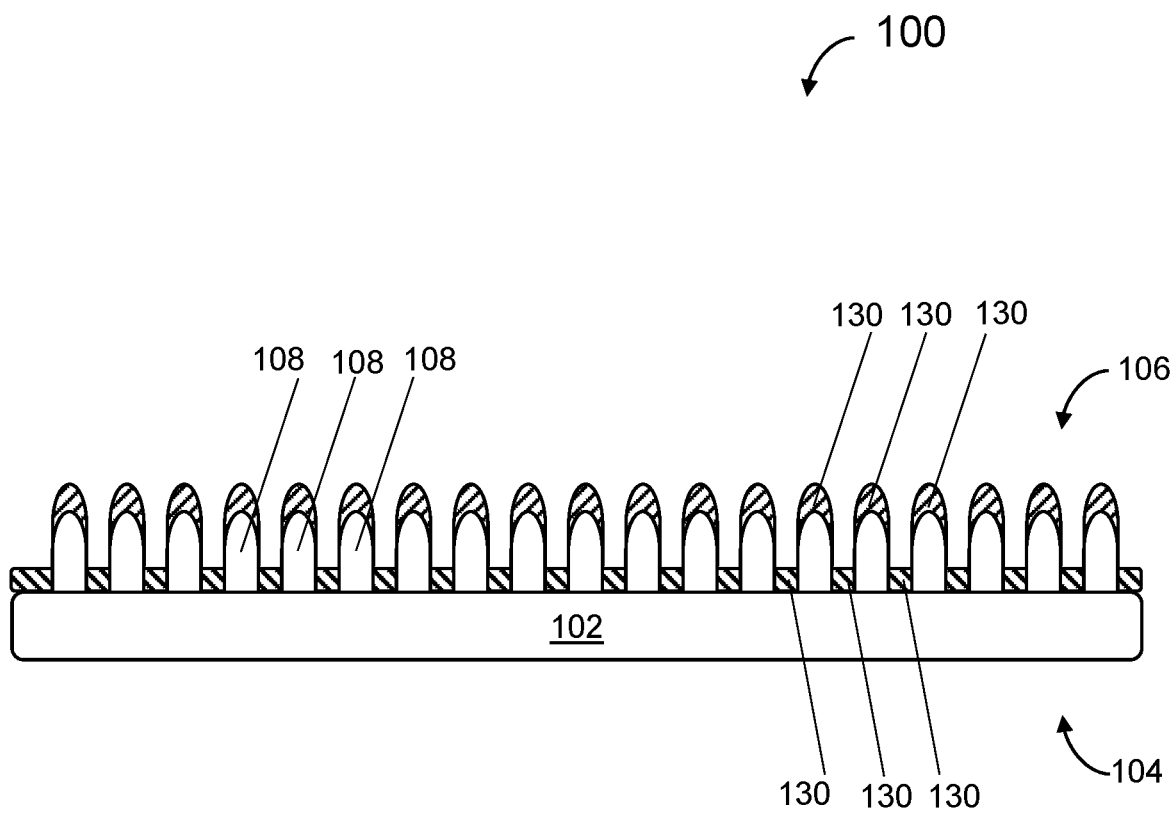
FIG. 3 illustrates a cross-sectional view of the embodiment of the water vapor permeable ribbed membrane of FIGS. 1-2, according to some embodiments.

With reference to the figures, FIG. 1 illustrates a top view of an embodiment of a water vapor permeable ribbed membrane 100, FIG. 2 illustrates a bottom view of the embodiment of the water vapor permeable ribbed membrane 100, and FIG. 3 illustrates a cross-sectional view of the embodiment of the water vapor permeable ribbed membrane 100, according to some embodiments. As shown in FIGS. 1 and 2, the water vapor permeable ribbed membrane 100 is spread out flat. As shown, in some embodiments, the top surface of the water vapor permeable ribbed membrane 100 is a flat surface. Although not shown, in some embodiments, a plurality of ribs 130 is located on the top surface 104 of the water vapor permeable ribbed membrane 100, either in addition to being located on the bottom surface 106 or as an alternative to having the plurality of ribs 130 on the bottom surface 106.

In some embodiments, the water vapor permeable ribbed membrane 100 comprises a membrane 102 having a top surface 104, a bottom surface 106 opposite the top surface 104, and a plurality of ribs 108 located on the bottom surface 106. In some embodiments, the bottom surface 106 has a first edge portion 110, a second edge portion 112 opposite the first edge portion 110, a third edge portion 114 extending between the first edge portion 110 and the second edge portion 112, and a fourth edge portion 116 opposite the third edge portion 114 and extending between the first edge portion 110 and the second edge portion 112. In some embodiments, a middle portion 118 is disposed apart from the first edge portion 110, the second edge portion 112, the third edge portion 114, and the fourth edge portion 116.

In some embodiments, the water vapor permeable ribbed membrane 100 comprises an adhesive layer 130. In some embodiments, the adhesive layer 130 is configured to adhere the water vapor permeable ribbed membrane 100 to at least one panel member which is secured to a building frame structure. In some embodiments, the adhesive layer 130 is configured to adhere the water vapor permeable ribbed membrane 100 to a top surface of another water vapor permeable ribbed membrane (e.g., so as to form a part of a building envelope system). In some embodiments, the adhesive layer 130 covers any or all of the middle portion 118. In some embodiments, the adhesive layer 130 covers at least one of the first edge portion 110, the second edge portion 112, the third edge portion 114, the fourth edge portion 116, or any combination thereof. In some embodiments, the adhesive layer 130 can cover any or all of the edge portions.

In some embodiments, the water vapor permeable ribbed membrane 100 comprises a removable liner. In some embodiments, the removable liner covers the adhesive layer 130 on the bottom surface 106 of the membrane 102. In some embodiments, the removable liner covers at least one of the first edge portion 110, the second edge portion 112, the third edge portion 114, the fourth edge portion 116, or any combination thereof. In some embodiments, the removable liner can cover any or all of the edge portions. In some embodiments, the removable liner covers any or all of the middle portion 118.

Figure 4:
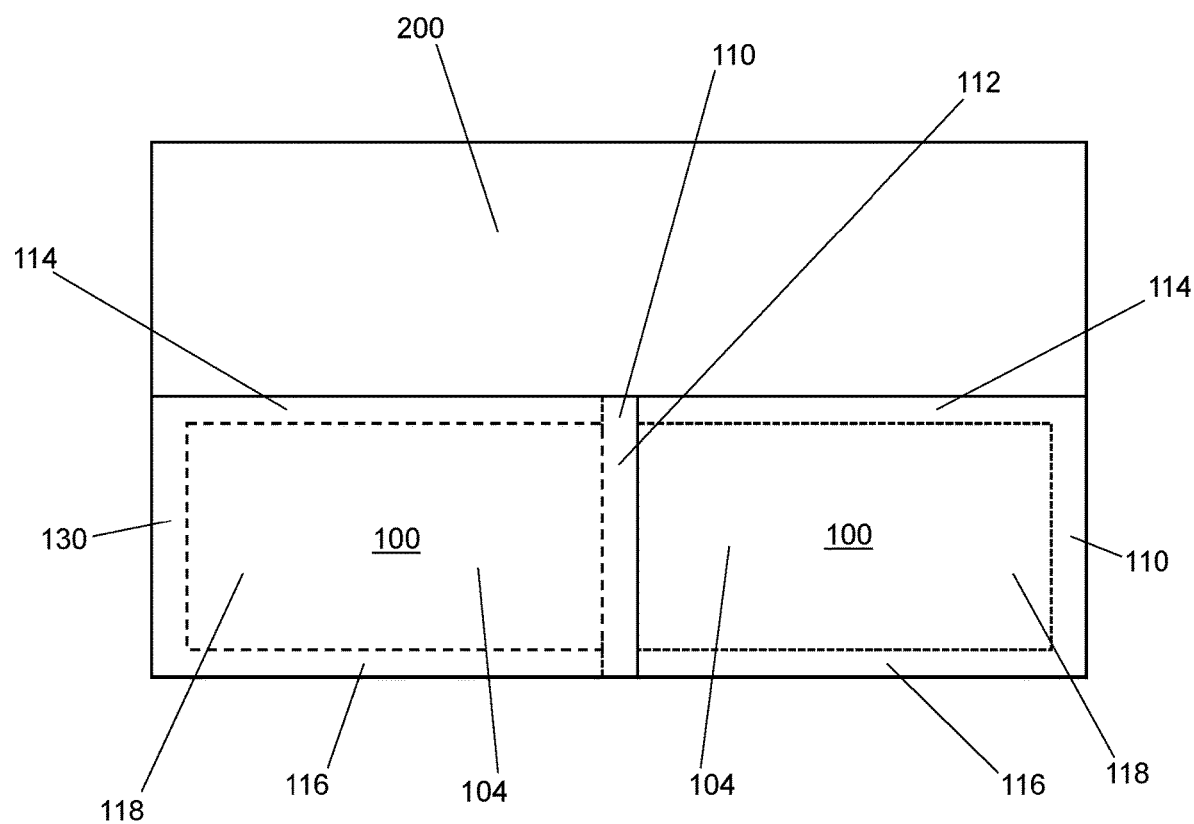
FIG. 4 illustrates a top view of an embodiment in which two of the water vapor permeable ribbed membranes of FIGS. 1-3 are installed on a building, according to some embodiments.

FIG. 4 illustrates a top view of an embodiment in which two water vapor permeable ribbed membranes 100 are installed on a building, for example, as part of a building envelope system. Given that a top view is illustrated, the edge portions of the water vapor permeable ribbed membranes are shown in dotted lines. The water vapor permeable ribbed membranes 100 may include a first water vapor permeable ribbed membrane and a second water vapor permeable ribbed membrane. To install the water vapor permeable ribbed membranes 100, the first water vapor permeable ribbed membrane and the second water vapor permeable ribbed membrane are adhered to at least one panel member 200 which is secured to a building frame structure. In addition, one of the edge portions of the first water vapor permeable ribbed membrane overlaps with, and is adhered to, the top surface of the second water vapor permeable ribbed membrane.

Figure 5:
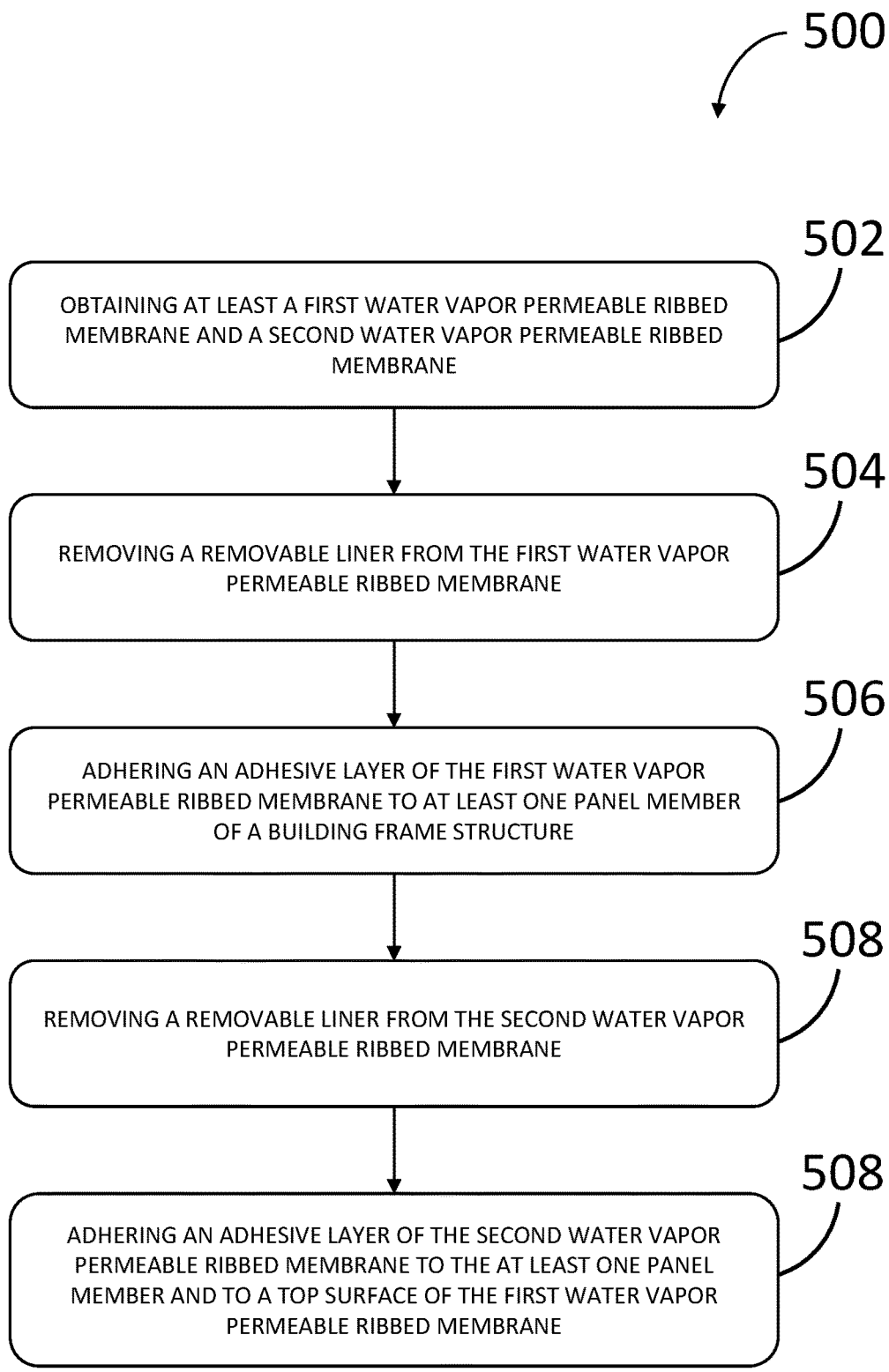
FIG. 5 illustrates a flowchart of a method of installation, according to some embodiments.

FIG. 5 is a flowchart of a method of installation 500, according to some embodiments. As shown in FIG. 5, in some embodiments, the method of installation 500 comprises one or more of the following steps: obtaining 502 at least one water vapor permeable, wherein the at least one water vapor permeable ribbed membrane comprises a first water vapor permeable ribbed membrane and a second water vapor permeable ribbed membrane; removing 504 the removable liner from the first water vapor permeable ribbed membrane; adhering 506 the adhesive layer of the first water vapor permeable ribbed membrane to at least one panel member of a building frame structure; removing 508 the removable liner from the second water vapor permeable ribbed membrane; and adhering 510 the adhesive layer of the second water vapor permeable ribbed membrane to the at least one panel member of the building frame structure and to the top surface of the first water vapor permeable ribbed membrane.

Example 1

A water vapor permeable ribbed membrane having a ribbed surface was obtained. An adhesive layer was applied to the ribbed surface to form the water vapor permeable ribbed membrane. The adhesive layer covered the ribbed surface in its entirety. The adhesive layer included a pressure sensitive acrylic adhesive, and had a thickness that was less than the height of the ribs on the ribbed surface. The pressure sensitive acrylic adhesive at the applied thickness had a water vapor permeability of 10 perms or less and thus was not water vapor permeable. The water vapor permeable ribbed membrane, without the adhesive layer, had a water vapor permeability of greater than 10 perms and thus was water vapor permeable. The water vapor permeability and the peel adhesion of the resulting membrane, or Membrane (with Adhesive), was measured and compared to that of four samples, which included the Membrane (without Adhesive) and Comparative Membranes A-C, which included adhesive. Water vapor permeability at the applied thickness was measured in accordance with ASTM E96B. Peel adhesion was measured in accordance with ASTM D3330 (Method B, lap adhesion) (Method F, 90° peels). The results are summarized in Tables 1 and 2 below.

TABLE 1

Water Vapor Permeability (ASTM E96B)

| Sample | Permeability (perms) |
|---|---|
| Membrane (with Adhesive) | 48 |
| Membrane (without Adhesive) | 96 |
| Control Membrane A | 34 |
| Control Membrane B | 30 |
| Control Membrane C | 18 |

TABLE 2

Peel Adhesion (ASTM D3330 (Method B) (Method F))

| | Substrates (lb/in) | | |
|---|---|---|---|
| Sample | Stainless Steel | Plywood | Self |
| Membrane (with Adhesive) | 5 | 7 | 8 |
| Control Membrane A | 6 | 7 | 3 |
| Control Membrane B | n/a | n/a | n/a |
| Control Membrane C | 10 | 7 | 3 |

As shown above, relative to the Control Membrane A, the Control Membrane B, and the Control Membrane C, the Membrane (with Adhesive) exhibited superior permeability, as well as comparable peel adhesion with respect to stainless steel and plywood, and superior peel adhesion with respect to self.

Example 2

Various water vapor permeable ribbed membranes were obtained. Each water vapor permeable membrane had an adhesive layer located on and covering a ribbed surface. The adhesive and/or the coat weight of the adhesive was varied for each of the water vapor permeable membranes. The water vapor permeability and the peel adhesion of the various water vapor permeable membranes were measured at the applied thickness of the adhesive layer. Water vapor permeability was measured in accordance with ASTM E96A and ASTM E96B. Peel adhesion was measured in accordance with ASTM D3330 (Method F) (90° peels). Table 3 summarizes the water vapor permeability, peel adhesion, and coat weight for each of the water vapor permeable membranes (Samples A-D). The applied thickness of the adhesive layer in this Example 2 was different than the applied thickness of the adhesive layer in Example 1.

TABLE 3

| | Sample A | Sample B | Sample C | Sample D |
|---|---|---|---|---|
| Adhesive | Butyl | Acrylic | Acrylic | Acrylic |
| Water Vapor Transmission (Method A) (perms) | 11.7 | 12.6 | 14.5 | 22.4 |
| Water Vapor Transmission (Method B) (perms) | 12.5 | 20.5 | 19.9 | 31.5 |
| Peel Adhesion, Concrete (PLI) | 7.8 | 11.1 | 11 | 4.8 |
| Peel Adhesion, Aluminum (PLI) | 5.6 | 11.3 | 10.8 | 5 |
| Peel Adhesion, Gypsum (PLI) | 2.6 | 8.5 | 8 | 3 |
| Coat Weight (GSM) | n/a | 320 | 302 | 255 |

* water vapor transmission values and peel adhesion values are reported in Table 3 as average values As shown above, Sample B, Sample C, and Sample D exhibited greater water vapor transmission as measured according to both ASTM E96A and ASTM E96B, in comparison to Sample A. In addition, Sample B, Sample C, and Sample D exhibited greater or comparable peel adhesion to concrete, aluminum, and gypsum as measured according to ASTM D3330 (Method F), in comparison to Sample A. With respect to Sample B, Sample C, and Sample D, these samples demonstrated that the water vapor transmission performance of the water vapor permeable ribbed membranes was modulated by varying the coat weight of the adhesive, while maintaining peel adhesion performance across all three (3) of the tested substrates—i.e., concrete, aluminum, and gypsum.

Example 3

Various water vapor permeable ribbed membranes were obtained. Each of the water vapor permeable ribbed membranes comprised a strip of adhesive, in different locations and at different coat weights, on the ribbed surface of the water vapor permeable ribbed membrane. The locations included a strip of adhesive extending along a length of two opposing edge portions of the water vapor permeable ribbed membrane and a strip of adhesive extending down a middle center portion of the water vapor permeable ribbed membrane. The water vapor permeability and the peel adhesion of the various water vapor permeable membranes were measured at the applied thickness of the adhesive layer. Water vapor permeability was measured in accordance with ASTM E96A and ASTM E96B. Peel adhesion was measured in accordance with ASTM D3330 (Method F) (90° peels). Table 4 summarizes the water vapor permeability, peel adhesion, and coat weight for each of the water vapor permeable membranes (Samples E-F). The applied thickness of the adhesive layer in this Example 3 was different than the applied thickness of the adhesive layer in Example 1 and Example 2.

TABLE 4

| | Sample E (edge portion) | Sample F (middle center portion) |
|---|---|---|
| Water Vapor Transmission (Method A) (perms) | 82.9 | n/a |
| Water Vapor Transmission (Method B) (perms) | 106.3 | n/a |

TABLE 4-continued

| | Sample E (edge portion) | Sample F (middle center portion) |
|---|---|---|
| Peel Adhesion, Concrete (PLI) | 7.4 | 14.4 |
| Peel Adhesion, Aluminum (PLI) | 11.9 | 7.8 |
| Peel Adhesion, Gypsum (PLI) | 4.4 | 9.3 |
| Coat Weight (GSM) | 490 | 490 |

* water vapor transmission values and peel adhesion values are reported in Table 4 as average values As shown above, when the adhesive was located along the edge portions of the water vapor permeable ribbed membrane as shown by Sample E, the water vapor permeable ribbed membraned, at the applied thickness of the adhesive layer, maintained peel adhesion, in comparison to Sample F, where the adhesive was located down the middle center portion of the water vapor permeable ribbed membrane. In addition, Sample E exhibited strong performance with respect to water vapor permeability as measured according to ASTM E96A and ASTM E96B.

What is claimed is:

1. A building envelope system comprising:
    a building frame structure;
    at least one panel member;
        wherein the at least one panel member is secured to the building frame structure;
    a first water vapor permeable ribbed membrane; and
    a second water vapor permeable ribbed membrane;
        wherein each of the first water vapor permeable ribbed membrane and the second water vapor permeable ribbed membrane comprises:
            a top surface;
            a bottom surface opposite the top surface; and
            a plurality of ribs located on at least the bottom surface;
                wherein the bottom surface has:
                    a first edge portion,
                    a second edge portion opposite the first edge portion,
                    a third edge portion extending between the first edge portion and the second edge portion, and
                    a fourth edge portion opposite the third edge portion and extending between the first edge portion and the second edge portion; and
                an adhesive layer located on the plurality of ribs;
                    wherein the adhesive layer covers at least a portion of the plurality of ribs;
                    where at least a portion of the adhesive layer has a thickness that is less than a rib height of the plurality of ribs such that a portion of the plurality of ribs is exposed through the adhesive layer;
                    wherein the adhesive layer of the first water vapor permeable ribbed membrane adheres the first edge portion of the first water vapor permeable ribbed membrane to the second water vapor permeable ribbed membrane;
                    wherein the adhesive layer of the first water vapor permeable ribbed membrane adheres the first water vapor permeable ribbed membrane to the at least one panel member;
                    wherein the adhesive layer of the second water vapor permeable ribbed membrane adheres the second water vapor permeable ribbed membrane to the at least one panel member.

2. The building envelope system of claim 1,
    wherein the first water vapor permeable ribbed membrane directly contacts the second water vapor permeable ribbed membrane and the at least one panel member;
    wherein the second water vapor permeable ribbed membrane directly contacts the first water vapor permeable ribbed membrane and the at least one panel member.

3. The building envelope system of claim 1,
    wherein the adhesive layer of the first water vapor permeable ribbed membrane covers an entire bottom surface of the first water vapor permeable ribbed membrane;
    wherein the adhesive layer of the second water vapor permeable ribbed membrane covers an entire bottom surface of the second water vapor permeable ribbed membrane.

4. The building envelope system of claim 1, wherein a portion of the plurality of ribs of the first water vapor permeable ribbed
    membrane is exposed through the adhesive layer of the first water vapor permeable ribbed membrane;
    wherein a portion of the plurality of ribs of the second water vapor permeable ribbed membrane is exposed through the adhesive layer of the second water vapor permeable ribbed membrane.

5. The building envelope system of claim 1,
    wherein a coat weight of the adhesive layer of the first water vapor permeable ribbed membrane is 200 GSM to 600 GSM;
    wherein a coat weight of the adhesive layer of the second water vapor permeable ribbed membrane is 200 GSM to 600 GSM.

6. The building envelope system of claim 1,
    wherein the plurality of ribs of the first water vapor permeable ribbed membrane is integral to the bottom surface of the first water vapor permeable ribbed membrane;
    wherein the plurality of ribs of the second water vapor permeable ribbed membrane is integral to the bottom surface of the second water vapor permeable ribbed membrane.

7. The building envelope system of claim 1, wherein each of the first water vapor permeable ribbed membrane and the second water vapor permeable ribbed membrane has a water vapor permeability of greater than 10 perms, as measured according to ASTM E96B.

8. The building envelope system of claim 7, wherein the adhesive layer of each of the first water vapor permeable ribbed membrane and the second water vapor permeable ribbed membrane has a water vapor permeability of 10 perms or less, as measured according to ASTM E96B.

9. The building envelope system of claim 8, wherein the adhesive layer of each of the first water vapor permeable ribbed membrane and the second water vapor permeable ribbed membrane has a water vapor permeability of 1 perm to 10 perms, as measured according to ASTM E96B.

10. The building envelope system of claim 8, wherein the adhesive layer of each of the first water vapor permeable ribbed membrane and the second water vapor permeable ribbed membrane has a water vapor permeability of 0.1 perms to 1 perm, as measured according to ASTM E96B.

11. The building envelope system of claim 8, wherein a portion of the adhesive layer that is adhered to the second water vapor permeable ribbed membrane exhibits a peel adhesion of at least 1.5 lb/in, as measured according to ASTM D3330 (Method B).

12. The building envelope system of claim 11, wherein a portion of the adhesive layer that is adhered to the second water vapor permeable ribbed membrane exhibits a peel adhesion of 1.5 lb/in to 25 lb/in, as measured according to ATSM D3330 (Method B).

13. The building envelope system of claim 1, wherein each of the first water vapor permeable ribbed membrane and the second water vapor permeable ribbed membrane has a water vapor permeability of 20 perms to 120 perms, as measured according to ASTM E96B.

14. The building envelope system of claim 1, wherein the bottom surface has:
- a first edge portion,
- a second edge portion opposite the first edge portion,
- a third edge portion extending between the first edge portion and the second edge portion, and
- a fourth edge portion opposite the third edge portion and extending between the first edge portion and the second edge portion,
  - wherein the adhesive layer of the first water vapor permeable ribbed membrane adheres the first edge portion of the first water vapor permeable ribbed membrane to the top surface of the second water vapor permeable ribbed membrane.

* * * * *